(12) United States Patent
Satomi et al.

(10) Patent No.: US 8,842,322 B2
(45) Date of Patent: *Sep. 23, 2014

(54) IMAGE EDITING SYSTEM, IMAGE MANAGEMENT APPARATUS, AND IMAGE EDITING PROGRAM

(71) Applicant: Canon Kabushiki Kaisha, Tokyo (JP)

(72) Inventors: Hiroshi Satomi, Yokohama (JP); Yosato Hitaka, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,087

(22) Filed: Oct. 31, 2012

(65) Prior Publication Data
US 2013/0057934 A1 Mar. 7, 2013

Related U.S. Application Data

(63) Continuation of application No. 11/564,801, filed on Nov. 29, 2006, now Pat. No. 8,325,398.

(30) Foreign Application Priority Data

Dec. 22, 2005 (JP) ................................ 2005-370098
Feb. 1, 2006 (JP) ................................ 2006-024573

(51) Int. Cl.
| G06F 3/12 | (2006.01) |
| H04N 1/46 | (2006.01) |
| G11B 27/034 | (2006.01) |
| H04N 1/00 | (2006.01) |

(52) U.S. Cl.
CPC .......... *G11B 27/034* (2013.01); *H04N 1/00196* (2013.01); *H04N 1/00198* (2013.01)
USPC ..................... 358/1.15; 358/538; 358/1.18

(58) Field of Classification Search
USPC ......................................................... 358/1.15
See application file for complete search history.

(56) References Cited

U.S. PATENT DOCUMENTS

| 5,911,139 A * | 6/1999 | Jain et al. ................................ 1/1 |
| 8,248,651 B2 * | 8/2012 | Fukuda ........................ 358/1.18 |
| 2003/0072486 A1 * | 4/2003 | Loui et al. ..................... 382/175 |
| 2004/0179124 A1 * | 9/2004 | Morimoto et al. ........ 348/333.02 |
| 2004/0190794 A1 * | 9/2004 | Belanger ..................... 382/305 |
| 2005/0134933 A1 * | 6/2005 | Tsue et al. ..................... 358/437 |

* cited by examiner

*Primary Examiner* — Huo Long Chen
(74) *Attorney, Agent, or Firm* — Canon USA, Inc., IP Division

(57) ABSTRACT

An image layout apparatus includes a cropping unit, a displaying unit, a checking unit, first and second computing units, a noticing unit, and a preventing unit. The cropping unit crops an image file image. The displaying unit displays and arranges cropped images on a page. The checking unit checks whether first and second image files are same. The first computing unit computes, in response to the first image file and the second image file being the same, an overlapping area between a first displayed image and a second displayed image. The second computing unit computes overlapping size ratio of the computed overlapping area. The noticing unit notices, in response to the first image file and the second image file being the same, information regarding duplication of image files. The preventing unit prevents, in response to the computed overlapping size ratio being smaller than a predetermined value, noticing the information.

9 Claims, 34 Drawing Sheets

FIG. 4

400 ALBUM MANAGEMENT TABLE

| ALBUM ID | ALBUM NAME | KIND OF TEMPLATE | TOTAL NO. OF PAGES |
|---|---|---|---|
| a001ab | SPRING EXCURSION | snap01 | 10 PAGES |
| a256b | SUMMER CAMP | essay03 | 20 PAGES |
| a1c7rb | AUTUMN ATHLETIC MEETING | dynamic02 | 15 PAGES |
| ... | ... | ... | ... |

FIG. 5

| ITEM | TYPE | |
|---|---|---|
| IMAGE ID | INTEGER TYPE | 501 |
| IMAGE FILE NAME | INTEGER TYPE | 502 |
| LEFTMOST PIXEL FOR CROPPING | INTEGER TYPE | 503 |
| RIGHTMOST PIXEL FOR CROPPING | INTEGER TYPE | 504 |
| UPPERMOST PIXEL FOR CROPPING | INTEGER TYPE | 505 |
| LOWERMOST PIXEL FOR CROPPING | INTEGER TYPE | 506 |
| ROTATION ANGLE OF IMAGE | INTEGER TYPE | 507 |
| SHAPE OF AREA IN WHICH IMAGE IS PLACED | INTEGER TYPE | 508 |
| LEFTMOST PIXEL FOR DISPLAY | INTEGER TYPE | 509 |
| RIGHTMOST PIXEL FOR DISPLAY | INTEGER TYPE | 510 |
| UPPERMOST PIXEL FOR DIAPLAY | INTEGER TYPE | 511 |
| LOWERMOST PIXEL FOR DISPLAY | INTEGER TYPE | 512 |
| IMAGE FILE PASS | INTEGER TYPE | 513 |
| ALBUM ID | INTEGER TYPE | 514 |
| PAGE NUMBER | INTEGER TYPE | 515 |

FIG. 9

| ITEM | TYPE |
|---|---|
| WARNING-DETERMINED IMAGE OVERLAPPING RATIO | FLOATING POINT TYPE |

| ITEM | TYPE | |
|---|---|---|
| NUMBER OF CENTER-SPREAD PAGES | INTEGER TYPE | ~1101 |
| PAGE NUMBER OF CENTER-SPREAD PAGE CURRENTLY BEING EDITED | INTEGER TYPE | ~1102 |
| ALBUM ID | INTEGER TYPE | ~1103 |

| ITEM | TYPE | |
|---|---|---|
| CENTER-SPREAD PAGE NUMBER | INTEGER TYPE | ~1201 |
| PIXEL NUMBER WITHIN PAGE (NUMBER OF IMAGE AREAS) | INTEGER TYPE | ~1202 |
| IMAGE NUMBER OF FIRST IMAGE WITHIN PAGE | INTEGER TYPE | ~1203 |
| ALBUM ID | INTEGER TYPE | ~1204 |

2000 PARTICIPANT INFORMAITION MANAGEMENT TABLE

| PARTICIPANT NAME | Email Address |
|---|---|
| A | a |
| B | b |
| C | c |
| D | d |
| ⋮ | ⋮ |

```
<?xml version="1.0" encode=Shift_JIS"?>
<!DOCTYPE AlbumCheckData SYSTEM " AlbumCheckData.dtd">
<xmlns: AlbumCheckData ="http://www.ALBUM SITE DOMAIN NAME Album/">

<AlbumCheckData>
  <UserInfo UserName="A">
  </UserInfo>
  <SendData AlbumID="Album24"AlbumPageNumber="5"ImageCount="3">
    <ImageItem ImageID="1">
      <checkthum checkdata="Image1.jpg/>
      <cliprect top="0"bottom="400"left="0"right="600"/>
      <viewrect top="600"bottom="1400"left="4"right="1600"/>
      <rotate angle="0"/>
    </ImageItem>
    </ImageItem ImageID="2">
      <checkthum checkdata="Image2.jpg/>
      <cliprect top="100"bottom="900"left="150"right="750"/>
      <viewrect top="600"bottom="800"left="2350"right="2650"/>
      <rotate angle="0"/>
    </ImageItem>
    </ImageItem ImageID="3">
      <checkthum checkdata="Image3.jpg/>
      <cliprect top="0"bottom="1200"left="0"right="1600"/>
      <viewrect top="600"bottom="800"left="3250"right="3650"/>
      <rotate angle="90"/>
    </ImageItem>
  </SendData >
</AlbumCheckData>
```

FIG. 26

```
Date:Fri,19 Sep.2005 11:19:08+09
From:PhotoSite<△△△@xxx.co.jp>
To:aaa@○△□
Subject:NOTIFICATION OF REGISTRATION OF OVERLAPPING IMAGE
Error-to△△△@xxx.co.jp
Content-Type:text/plain;charset="ISO-2022-JP"
Content-Transfer-Encoding:7bit THE SAME IMAGE AS IN FIFTH AND SIXTH PAGES OF THE ALBUM THAT
YOU HAVE REGISTERED MAY BE USED IN THIRD PAGE OF THE ALBUM THAT
PERSON B HAS PRODUCED.

PLEASE CHECK FOR OVERLAPPING FROM ALBUM EDITING SOFTWARE.
```

FIG. 27

2700 PAGE INFORMATION MANAGEMENT TABLE

| ALLOCATED PAGE NUMBER | USER NAME | NUMBER OF IMAGES | PAGE DATA FILE NAME |
|---|---|---|---|
| 1 | A | 3 | /album_xx/page1.jpg |
| 2 | B | 4 | /album_xx/page2.jpg |
| 3 | C | 1 | /album_xx/page3.jpg |
| 4 | B | 0 | |
| 5 | D | 2 | /album_xx/page5.jpg |
| ⋮ | ⋮ | ⋮ | ⋮ |
| 2701 | 2702 | 2703 | 2704 |

FIG. 29

```
<?xml version="1.0" encode=Shift_JIS"?>
<!DOCTYPE CheckResult SYSTEM " CheckResult.dtd">
<xmlns: CheckResult="http://www.ALBUM SITE DOMAIN NAME Album/">

<CheckResult>
  <SameImage ImageCount="1">
    <SameItem SentImageID="2">
      <FoundImage FoundImageID="12"/>
    </SameItem>
  </SameImage>
</CheckResult>
```

IMAGE EDITING SYSTEM, IMAGE MANAGEMENT APPARATUS, AND IMAGE EDITING PROGRAM

CROSS REFERENCE TO RELATED APPLICATIONS

The present application is a continuation of U.S. patent application Ser. No. 11/564,801, filed on Nov. 29, 2006, which claims priority from Japanese Patent Application No. 2006-024573, filed Feb. 1, 2006, and from Japanese Patent Application No. 2005-370098, filed Dec. 22, 2005, all of which are hereby incorporated by reference herein in their entirety.

BACKGROUND OF THE INVENTION

1. Field of the Invention

The present invention relates to a technique for editing, arranging, and displaying a plurality of images by using an information processing apparatus.

2. Description of the Related Art

Conventionally, there is an information processing apparatus such as a personal computer that is capable of capturing an image file by using an application program so as to display the image file on a display screen. In addition, there is a PC that is capable of creating an electronic album by arranging a plurality of images on a plurality of pages by using an application program.

Further, there is a PC that is capable of capturing an image file by photographing with a digital camera and uploading the image file to an image management server via a network so as to share an image with other users.

Among conventional electronic album creation apparatuses as described above, there is an electronic album creation apparatus that is capable of confirming, by an instruction of a creator of an album, whether an image file to be captured in an electronic album overlaps with an image file already captured, based on attribute information such as a file name of the image file, and issues a warning to the creator of the album if there is an overlapping image file.

In recent years, a digital camera can photograph an image having an excellent quality which enables sufficient printing and display in an electronic album even in the case of a cropped image obtained by extracting only one part of an image.

However, a conventional electronic album creation apparatus as described above has following defectives when an image file is loaded into an electronic album while confirming whether the same image file is already used based on attribute information such as a file name.

FIG. 33 illustrates one defective as an example. The example as shown in FIG. 33 shows three images 3301, 3302, and 3303. Each of the images 3301, 3302, and 3303 is obtained by cropping different areas of one image file 3304. In the example as shown in FIG. 33, the creator of the album desires to intentionally capture the same image file so as to use the images of different portions of the image file for the electronic album.

FIG. 34 illustrates another defective as an example. An image 3401 is obtained by enlarging an image 3402. Thus, images can be obtained by changing a display magnification and enlarging a whole part of one image in multiple steps. Also in this case, the creator of the album desires to intentionally capture the same image file in an overlapping manner so as to use an image magnified or reduced at a different magnification for the electronic album.

However, in a conventional album creation apparatus as described above, whether the image files mutually overlap, is determined based on attribute information such as a file name of each image file at a time of capturing the image files. Accordingly, an intent of the creator of an album is not considered, and a warning is issued even when different forms of the same image file are used in the electronic album. This requires the creator of the album to inconveniently respond to the meaningless warning.

In a conventional album creation apparatus as described above, the determination as to whether the image files overlap is made at the time of capturing the image files. Accordingly, once the image files are taken into the album, no warning is issued to the creator of the album even if the creator of the album completes editing of the album forgetting the processing for cropping the image, or magnification and reduction processing. Accordingly, a plurality of similar images may be included in the album, and thus the creator of the album may undesirably obtain a failed print product and preview image of an album.

In addition, since an electronic album includes a number of pages and images, in a case where a warning of overlapping images is generated, there is a need to notify a user where an image is placed which overlaps with the image that the user desires to use.

Further, in a case where a plurality of users create an electronic album in cooperation using a server on a network, the users often desire to be able to easily know what kind of images are utilized by other users and in what situation, so as to prevent unintentional use of an overlapping image.

In addition, there is a case where even when the image that the user desires to use overlaps with an image existing in an electronic album, the user absolutely wishes to use the image. In this case, the addition of the overlapping image by the user can disturb the other user who has registered the same overlapping image. Accordingly, in this case, there is a need to send a message to the other user to that effect.

SUMMARY OF THE INVENTION

According to an aspect of the present invention, an image layout apparatus includes a cropping unit configured to crop an image corresponding to an image file, a displaying unit configured to display and arrange a plurality of cropped images on a page, a checking unit configured to check whether a first image file of a first displayed image and a second image file of a second displayed image are same based on at least one of file names of image files and binary data of the image files, a first computing unit configured to compute, in response to a result of the checking indicating that the first image file and the second image file are the same, an overlapping area between the first displayed image and the second displayed image, a second computing unit configured to compute overlapping size ratio of the computed overlapping area in the image of the image file, a noticing unit configured to notice, in response to the result of the checking indicating that the first image file and the second image file are the same, information regarding duplication of image files, and a preventing unit configured to prevent, in response to the computed overlapping size ratio being smaller than a predetermined value, the noticing unit from noticing the information.

According to another aspect of the present invention, at least one embodiment is directed to an electronic album editing system that edits an electronic album in which a plurality of images are arranged, and includes a server apparatus capable of communicating with a client apparatus via a network. The client apparatus includes: an editing unit configured to edit an image file; a display control unit configured to control display so that the images are displayed in the electronic album based on the image file and editing information on the editing performed by the editing unit; and an editing information sending unit configured to send the editing information to the server apparatus. The server apparatus includes: an editing information receiving unit configured to receive the editing information from the client apparatus; an editing information storage unit configured to store the editing information that is received by the editing information receiving unit; a determination unit configured to determine whether the images that are displayed by the display control unit overlap with each other based on the editing information stored in the editing information storage unit; and a notification unit configured to notify a result of determination performed by the determination unit to the client apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 schematically illustrates an album management table that is stored in a hard disk of the album creation apparatus according to the exemplary embodiment of the present invention.

FIG. 5 schematically illustrates an image management table that is stored in a hard disk of the album creation apparatus according to the exemplary embodiment of the present invention.

FIG. 9 schematically illustrates a warning management table that is stored in the hard disk of the album creation apparatus according to the exemplary embodiment of the present invention.

FIG. 11 schematically illustrates a page management table that is stored in the hard disk of the album creation apparatus according to the exemplary embodiment of the present invention.

FIG. 12 schematically illustrates a page image management table that is stored in the hard disk of the album creation apparatus according to the exemplary embodiment of the present invention.

FIG. 20 schematically illustrates one example of a participant information management table according to the exemplary embodiment of the present invention.

FIG. 25 illustrates one example of verification data according to the exemplary embodiment of the present invention.

FIG. 26 illustrates one example of a content of an electronic mail according to the exemplary embodiment of the present invention.

FIG. 27 schematically illustrates one example of a page information management table according to the exemplary embodiment of the present invention.

FIG. 29 illustrates one example of returned data according to the exemplary embodiment of the present invention.

DETAILED DESCRIPTION OF THE EMBODIMENTS

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 1:
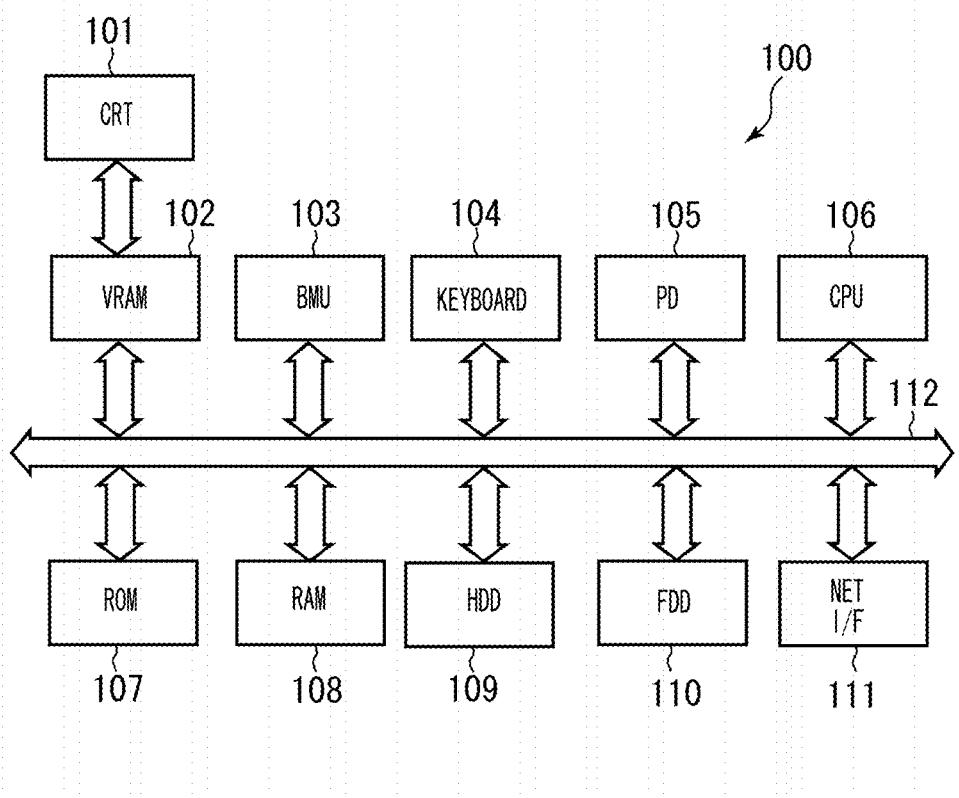
FIG. 1 illustrates a hardware configuration of an album creation apparatus according to an exemplary embodiment of the present invention.

FIG. 1 illustrates a hardware configuration of an album creation apparatus 100. The album creation apparatus 100 (also referred to herein as "electronic album editing apparatus") can be configured by an information processing apparatus such as a personal computer. The album creation apparatus 100 manages images by linking the images with an album, and creates an album using the images.

Referring to FIG. 1, a display device 101, which is configured by a cathode ray tube (CRT), displays editing information including an album that is currently edited, for example, a document, a graphic, an image, and a comment, and user interface information such as an icon, a message, and a menu. In this exemplary embodiment, an example is described in which a CRT is used as the display device, however, the display is not limited to the CRT. A liquid crystal display (LCD) and an electro luminescent (EL) display can also be used.

An image to be displayed on a display screen of the display device 101 is rendered on a video RAM (VRAM) 102. The image produced on the VRAM 102 is transferred to the display device 101 according to a specific regulation, and thus the image is displayed on the display device 101.

A bit move unit (BMU) 103 controls a data transfer between memories (for example, between the VRAM 102 and other memory) or between a memory and each I/O device (for example, a network interface 111).

A keyboard 104 includes various keys for inputting documents and the like. A pointing device 105 is used for pointing objects such as an icon and a menu displayed on the screen of the display device 101.

A central processing unit (CPU) 106 controls each device connected via a bus 112 based on a control program stored on a read only memory (ROM) 107 and a hard disk 109.

The ROM 107 stores various kinds of control programs and data. A random access memory (RAM) 108 includes a work area for the CPU 106, a save area for saving data at a time of handling an error, and a load area of the control program.

The hard disk 109 is capable of storing a content and control program that is executed in the information processing apparatus. The hard disk 109 of the album creation apparatus 100 stores a content file such as an image file and a text file, an operating system (OS), electronic album data, an image file, an album creation program, and a table for managing various kinds of information.

The hard disk 109 can be included in the information processing apparatus or can be externally installed so as to be controlled by the CPU 106. Additionally, it is noted that not all the information described above as an example need to be stored in the hard disk 109. Some of the information can be stored in an external file server so that a user can access and acquire the information as necessary.

Figure 2:
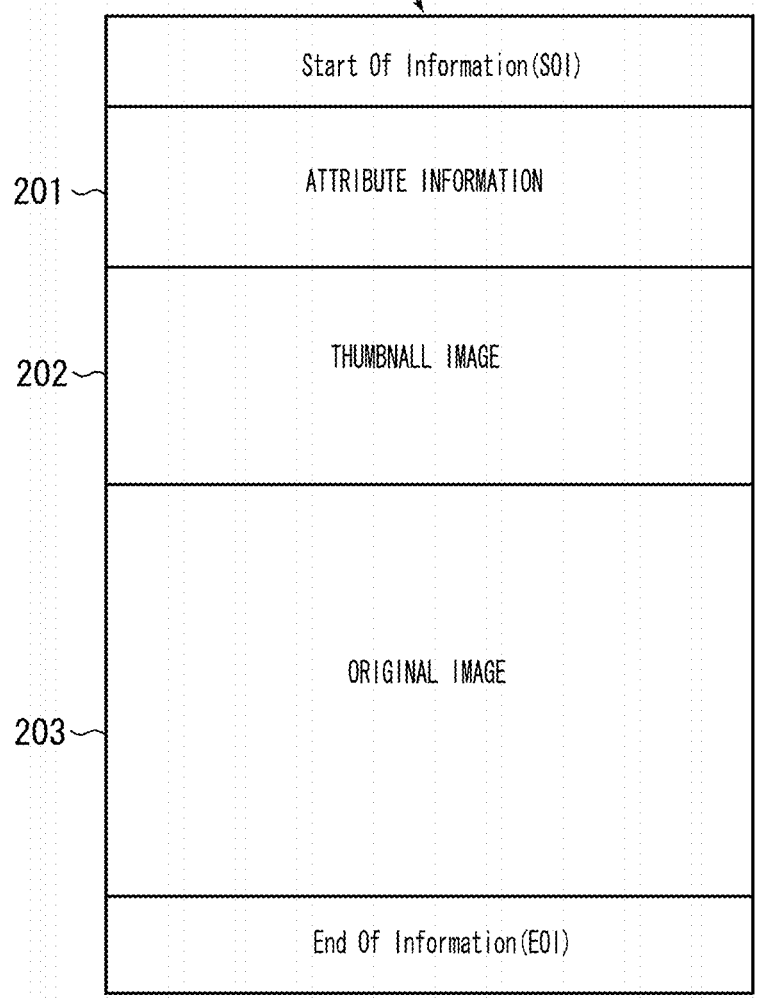
FIG. 2 illustrates a configuration of an image file according to the exemplary embodiment of the present invention.

FIG. 2 illustrates one example of a configuration of an image file 200 stored in the hard disk 109. When the image file 200 is an image file photographed by a digital camera, a portion 201 includes as attribute information, for example, photographing information such as date and time of photography, a model name of the digital camera, a shutter speed, a stop value, an exposure correction, and a white balance. In a portion 202, a thumbnail image is stored. The thumbnail image is compliant with a standard such as an Exif specification and has a resolution with which a content of the image can be confirmed. In a portion 203, an original image is stored. The original image has a resolution higher than the resolution of the thumbnail image. The original image 203 is suitable for printing on a paper and displaying on a large screen.

A flexible disk drive (FDD) 110 controls access to a flexible disk. Through the network interface 111, the information processing apparatus can communicate with other information processing apparatus and a printer.

The control program can be supplied to the CPU 106 from the ROM 107, the hard disk, and a flexible disk. In addition, the control program can be supplied to the CPU 106 from other information processing apparatus via the network interface 111.

Next, a procedure for executing the album creation program stored in the hard disk 109 and creating an album, which the CPU 106 of the album creation apparatus 100 performs, is described with reference to FIG. 3.

Figure 3:
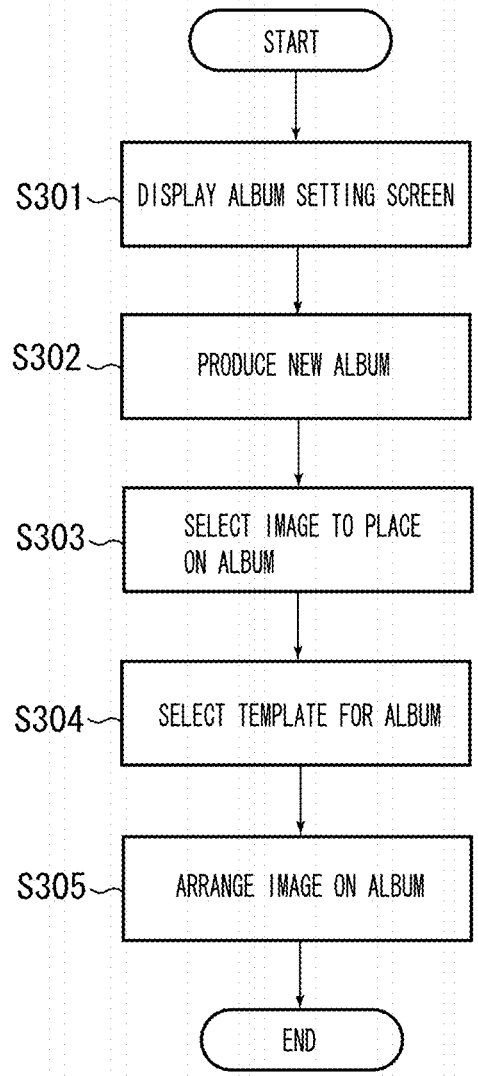
FIG. 3 illustrates a flow chart showing a procedure for creating a new album that is performed by the album creation apparatus according to the exemplary embodiment of the present invention.

Referring to FIG. 3, first, in step S301, the CPU 106 displays an album setting screen on the display device 101. The user, as instructed by the album setting screen, operates the keyboard 104 and the pointing device 105 so as to input a name of the album. Then, the user inputs an instruction for newly creating an album.

When the instruction for newly creating an album is input in step S301, in step S302, the CPU 106 issues an album ID for uniquely identifying the album that is to be newly created. Then, the CPU 106 adds a new record to an album management table 400 as shown in FIG. 4, and stores the record in the hard disk 109. An album ID 401, an album name 402, a type of template 403, which is described below, and a total number of pages 404 are managed using the album management table 400 as shown in FIG. 4.

In step S303, the CPU 106 displays an image selection screen on the display device 101. The user, as instructed by the album setting screen, operates the keyboard 104 and the pointing device 105 so as to select an image file to be linked with the album. Thumbnail images of each image files are displayed on the image selection screen. The user can select a desired image with reference to the displayed image files. In addition, a new record is created and managed as to the image selected by step S303 in an image management table 500 in the hard disk 109 as shown in FIG. 5. If the same image file is selected a plurality of times by step S303, a plurality of records having different image IDs 501, and a same file name 502 and file path 513 are produced.

FIG. 5 illustrates the image management table 500 that manages the images placed on the album by the album creation apparatus 100.

The records of the image management table 500 stores the image ID 501, the image file name 502, the image file path 513, an album ID 514 of the album on which the image is placed, and a page number 515. Here, with respect to the image ID 501, the images are serially numbered in an order of selection by step S303. For the page number 515, a value "1" is set to a first page, a value "2" is set to a next page (two-page-spread, page 2 and 3), and a value "n+1" is set to following pages (two-page-spread, page 2n and 2n+1). In addition, with respect to a portion of the image that is actually displayed in the album, information including following items is stored in the record. That is, an inner-image position 503 of a leftmost pixel for cropping, an inner-image position 504 of a rightmost pixel for cropping, an inner-image position 505 of an uppermost pixel for cropping, and an inner-image position 506 of a lowermost pixel for cropping, are stored in the record. In addition, an image rotation angle 507, a shape 508 of an area in which the image is displayed are stored in the record. Further, with respect to an area within the two-page-spread in which the image is displayed, a position 509 of a leftmost pixel for display, a display position 510 of a rightmost pixel, a display position 511 of an uppermost pixel, and a display position 512 of a lowermost pixel are stored in the record. In the shape 508, values linked with a shape are stored, such that a value "1" is set for a rectangle and a value "2" is set for an oval on which a displayed rectangle is inscribed. Coordinate values concerning the display position are managed in a coordinate system having its origin at an upper left position of the area in which an x-axis shows positive values on the right side of the origin and a y-axis shows positive values in a downward direction. The coordinate values concerning the display position correspond to the position on a paper on which each image area is printed when the album is printed.

In step S303, information is stored in the image ID 501, the image file name 502, the image file path 513, and the album ID 514, of the records. The storing of information about other parameters of the records is described below.

In step S304, the CPU 106 displays a template selection screen on the display device 101. The user, according to the template selection screen, operates the keyboard 104 and the pointing device 105 so as to select a type of a template. The template defines an arrangement, an output size, and a frame design of each image; a design of a background and a top cover; a page size; and the total number of pages. The definition of each template is stored in the hard disk 109. The values that indicate the type of the template selected by step S304 are stored in the hard disk 109 as the template type 403 of the album management table 400.

In step S305, the CPU 106 arranges the images on the album in the order of selection performed by step S303, according to the template selected by step S304. Then, the CPU 106 displays an album editing screen 600 on the display device 101. The CPU 106 stores information in each of the parameters 502 through 512 of the image management table 500, based on a state of the images arranged according to the template.

Figure 6:
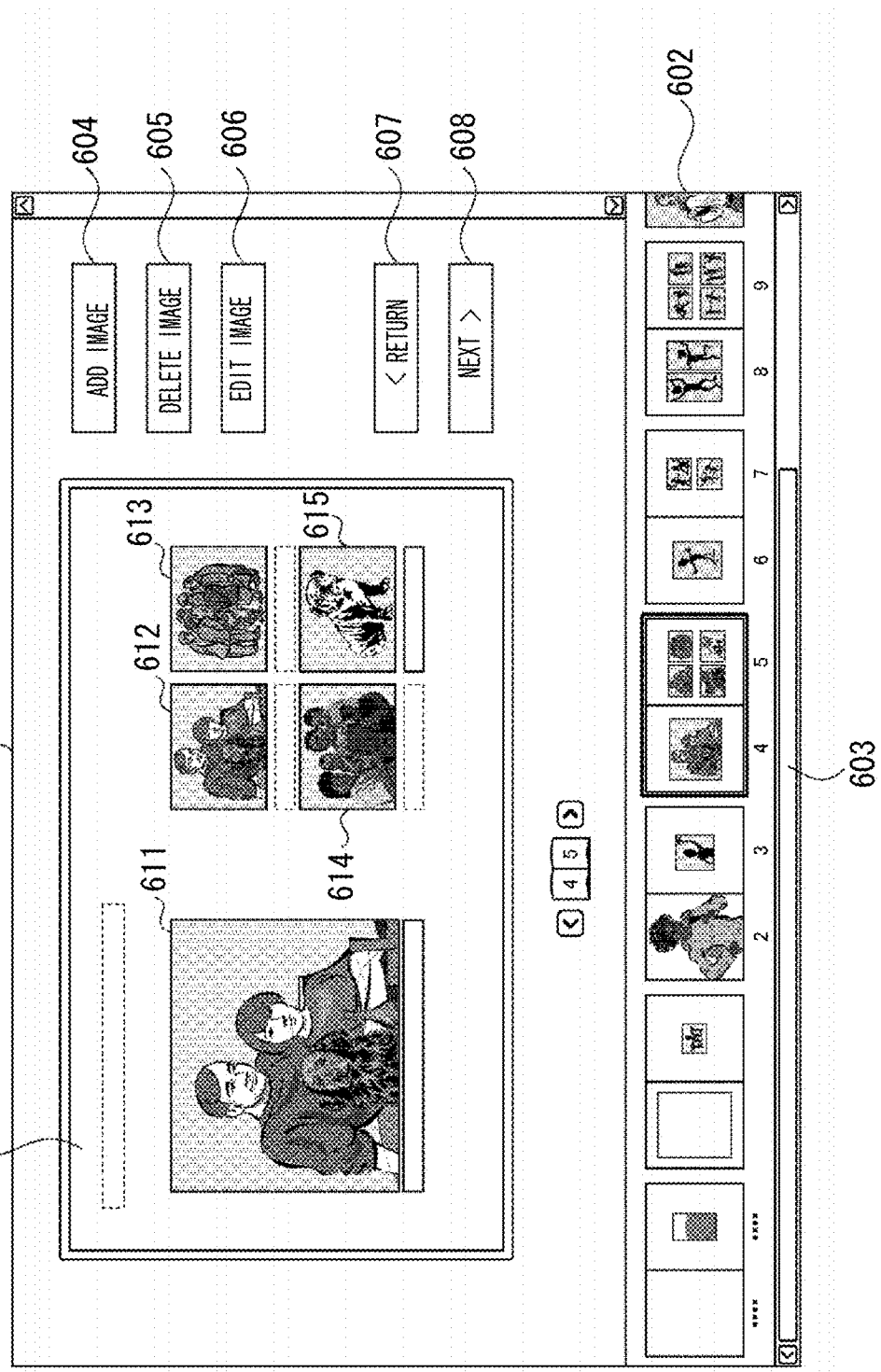
FIG. 6 illustrates an album editing screen displayed on a display device of the album creation apparatus according to the exemplary embodiment of the present invention.

FIG. 6 illustrates the album editing screen 600 displayed on the display device (CRT) 101 of the album creation apparatus 100.

In FIG. 6, a page editing area 601 for editing one two-page-spread in the album is shown. In the album editing screen 600 as shown in FIG. 6, five images are respectively displayed in five image areas 611 through 615 in the page editing area 601. Here, the coordinates of the position of each image displayed in the two-page-spread are stored in the parameters 509 through 512 of the image management table 500, respectively. The shape of the image area and the rotation angle of the image are stored in the parameter 508 and 507.

With respect to a whole image, the coordinates of the portion of the image actually displayed in the page editing area 601 are stored in the parameters 503 through 506 of the image management table 500. The CPU 106 reads the whole image of the image file stored in the hard disk 109. Then, the CPU 106 produces as a rendered image of the portion that is indicated by the coordinates 503 through 506 with respect to the read out whole image. Then, the CPU 106 stores the rendered image on the VRAM and displays the rendered image on the display device 101.

A page selection area 602 is an area for selecting the two-page-spread that is edited by the album creation apparatus 100. In the page selection area 602, the page produced in the album is displayed in a thumbnail image, per each two-page-spread. The two-page-spread that is currently displayed in the page editing area 601 and being edited, is highlighted. The user can change the two-page-spread displayed in the page editing area 601 by clicking and selecting the page to be edited, with the pointing device 105 from among the two-page-spreads that are displayed in thumbnails.

A scroll bar 603 is used when not all the pages can be displayed in a selected area of the two-page-spread. The user selects left and right arrow buttons that are respectively positioned at both ends of the scroll bar so as to display in the page selection area 602 the two-page-spread that is previous or subsequent to the two-page-spread currently displayed.

A button 604 is used for adding an image to the two-page-spread that is currently edited. The user can add an image to the two-page-spread displayed in the page editing area 601 by selecting an image file after pressing the button 604. A place in the page at which the image is added, is displayed in a manner such that image areas according to a number of images placed on each page of the album are previously stored in the template so as to automatically insert the images into the image areas . The place at which the image is added can be explicitly specified by the operation of the pointing device 105 by the user.

A button 605 is used for erasing the image placed in the two-page-spread displayed in the page editing area 601. The user selects one image from the two-page-spread displayed in the page editing area 601, and then presses the button 605. In response to the operation by the user, the CPU 106 does not allow the selected image to be displayed on the two-page-spread and erases the record of the image from the image management table 500. In addition, the CPU 106, after erasing the image, acquires the image area that is previously stored in the template and then according to the number of remaining images, rearranges the disposition of the remaining images so as to display the remaining images.

A button 606 is used for editing the image. When the user selects one image in the page editing area 601 and presses the image editing button 606, the CPU 106 displays an image editing screen 700 as shown in FIG. 7 on the display device 101.

Figure 7:
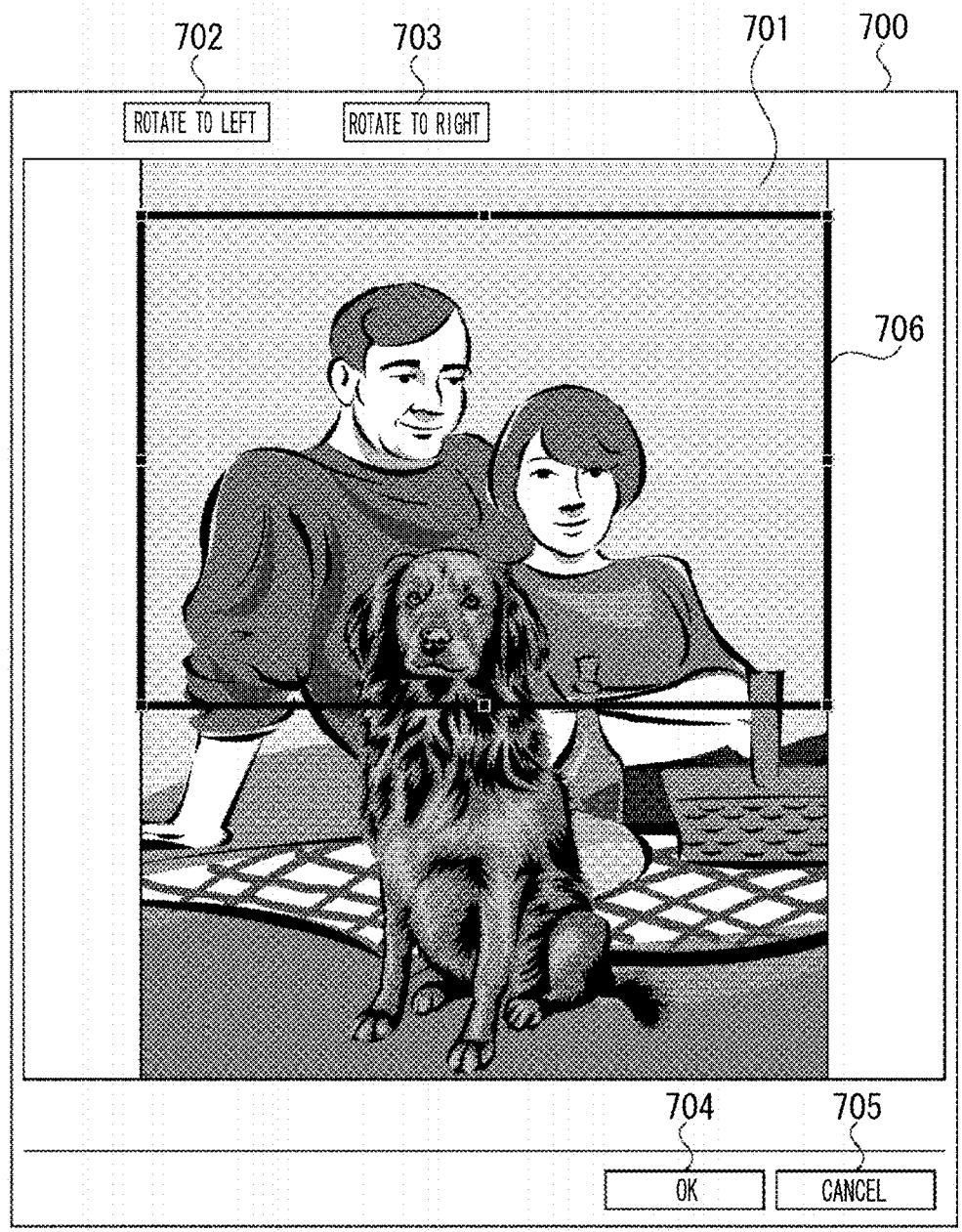
FIG. 7 illustrates an image editing screen displayed on the display device of the album creation apparatus according to the exemplary embodiment of the present invention.

FIG. 7 illustrates the image editing screen 700 according to this exemplary embodiment. By using the image editing screen 700 as shown in FIG. 7, the user can issue an instruction for editing the image such as an image rotation processing or a cropping processing which crops one portion of the image.

Referring to FIG. 7, an image editing area 701 displays the image that is currently edited. In addition, a portion of the currently-edited image that is actually displayed in the image area of the two-page-spread of the album is highlighted by a surrounded rectangular area 706. By dragging each side and vertex, the rectangular area 706 can be magnified or reduced. At this time, the rectangular area 706 is magnified and reduced while maintaining a same shape as the rectangle in the image area of the two-page-spread.

Buttons 702 and 703 are used for rotating the image. When the user presses each of the buttons 702 and 703, the image displayed in the image editing area 701 that is being edited, is rotated to left or right by 90 degrees.

When an OK button 704 is pressed by the user, the CPU 106 stores information including the content edited in the image editing screen 700 in the record of the image management table 500.

For example, when the position or the size of the rectangular area 706 is changed, the CPU 106 updates the parameters 503 through 506 in the record of the image management table 500 and stores the same. Then, the CPU 106 reads the whole image of the image file stored in the hard disk 109. Then, the CPU 106 produces an image of the portion as indicated by the coordinates 503 through 506 of the read-out whole image which are newly updated, as a rendered image. Then, the CPU 106 stores the rendered image to the VRAM, and then displays the album editing screen 600 on the display device 101 together with the edited image. If the position or the size of the rectangular area 706 is changed, the portion of the image which is newly specified, is displayed in the image area of the page editing area 601 of the album editing screen 600.

When the user presses a cancel button 705, a content edited in the image editing screen 700 is canceled. Then, the CPU 106 terminates the display of the image editing screen 700, and returns the display on the display device 101 to the album editing screen 600.

A button 607 as shown in FIG. 6 is used for issuing an instruction to return the display to the screen displayed previous to the album editing screen 600. While a detailed description is omitted in this exemplary embodiment, when the user presses the button 607, the CPU 106 displays a processing selection screen 800 as shown in FIG. 8 on the display device 101.

A button 608 is used for issuing an instruction to change the display to the screen subsequent to the album editing screen 600. When the user presses the button 608, the CPU 106 displays the processing selection screen 800 as shown in FIG. 8 on the display device 101.

Figure 8:
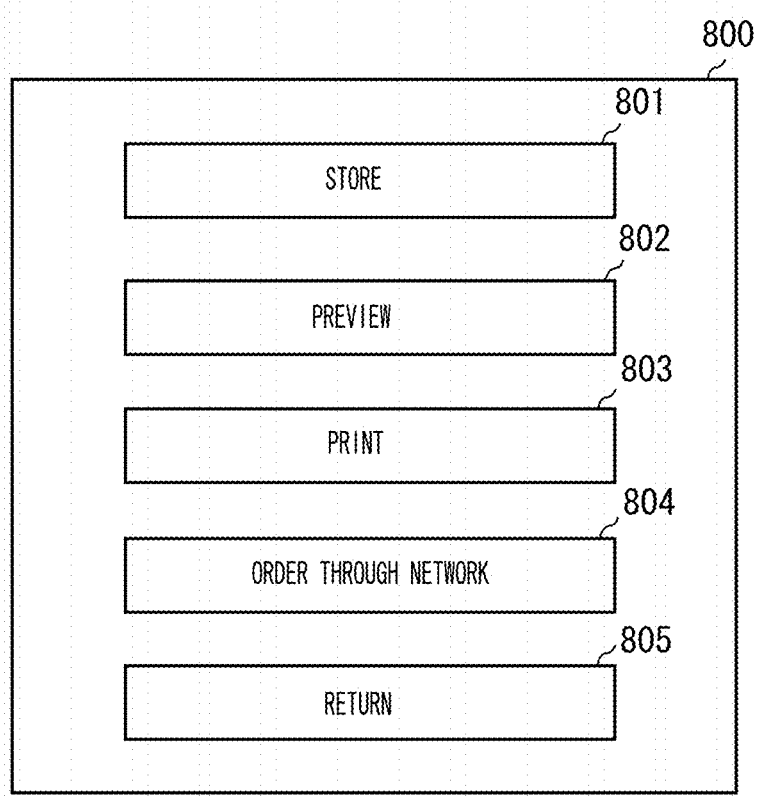
FIG. 8 illustrates a processing selection screen displayed on the display device of the album creation apparatus according to the exemplary embodiment of the present invention.

FIG. 8 illustrates the processing selection screen 800 that is displayed on the display device 101 when the user presses a "next" button 608 in the album editing screen 600.

Figure 13:
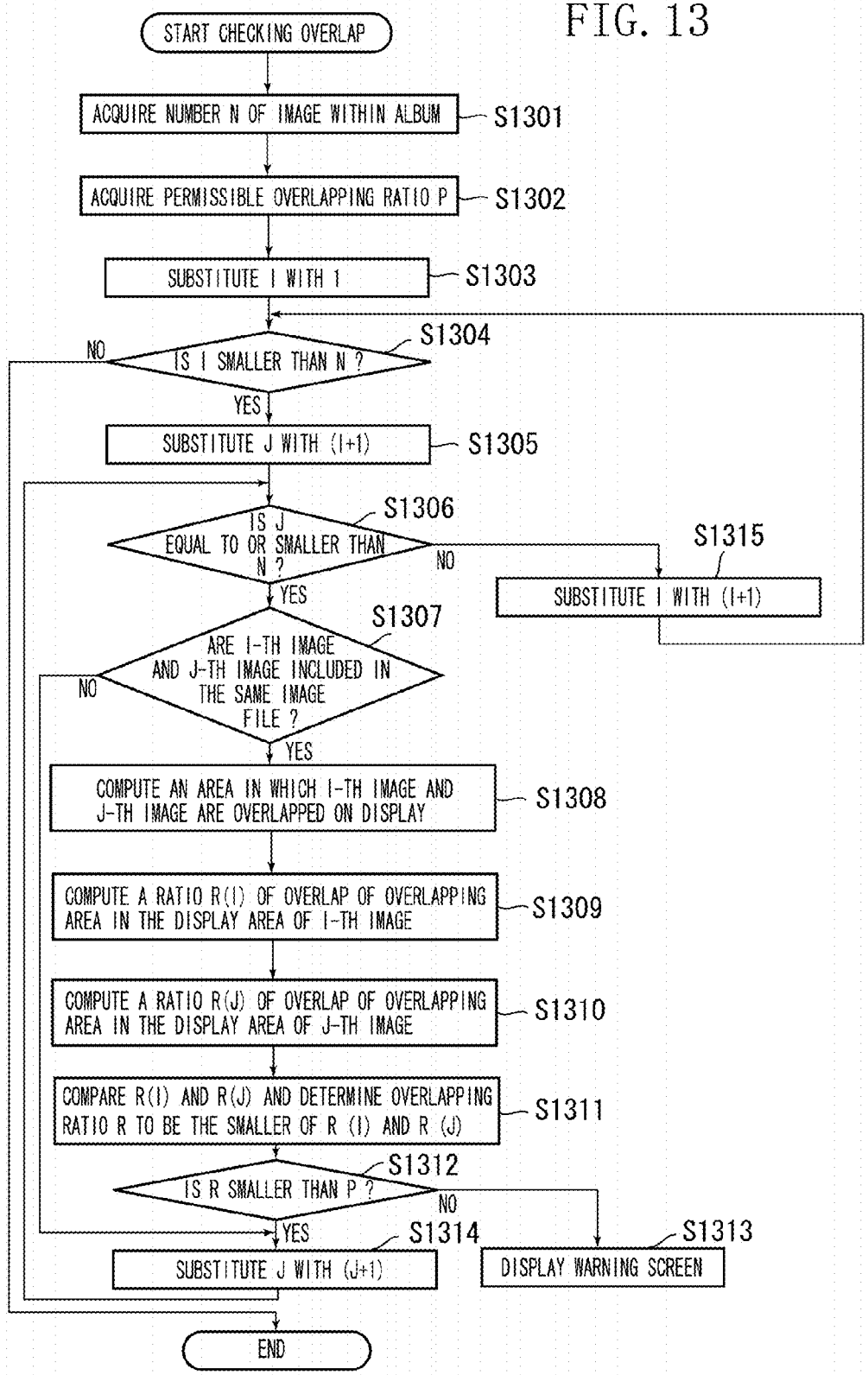
FIG. 13 is a flow chart that illustrates a procedure in which the album creation apparatus according to the exemplary embodiment of the present invention determines whether the images in the album are used in an overlapping manner and issues a warning to that effect.

When the user presses each of buttons 801 through 804, the CPU 106 starts a processing according to the flow as shown in FIG. 13 that is described below. Hereinbelow, the processing is described that is performed after the CPU 106 performs the flow as shown in FIG. 13 in response to pressing of the various buttons 801 through 804.

When the user presses the save button 801, the CPU 106 terminates receiving of editing operations and stores the content of each page of the album edited in the album editing screen 600, in each table in the hard disk 109. Then, the CPU 106 ends the processing in the album creation apparatus 100.

When the user presses a preview button 802, the CPU 106 terminates the receiving of the editing operations, and displays the content of each page of the album edited in the album editing screen 600 on the display device 101. In this manner, the user can confirm the content of the album. A detailed description thereof is omitted here.

When the user presses a print button 803, the CPU 106 terminates the receiving of the editing operations, and produces print data. The album consisting of the print data is printed on a paper in a form similar to the display on the album editing screen 600 that can be bound into a book.

More specifically, the CPU 106 acquires an album ID 1103 edited in the album editing screen 600 from a page management table 1100 that is stored in the hard disk 109. Then, the CPU 106 acquires records having an album ID 1204 that is the same as the acquired album ID 1103, from a page image management table 1200 stored in the hard disk 109, in an order from a first two-page-spread. Then, the CPU 106 refers to a number 1202 of image areas and a first image number 1203 of the acquired record and acquires the record of the image placed in the two-page-spread, from the image management table 500. Then, the CPU 106 acquires the image file 200 based on the image file path 513 of the acquired record. In addition, the CPU 106 refers to the template type 403 of the record that has the same album ID 401 as the acquired album ID 1103, from the album management table 400 stored in the hard disk 109. Then, the CPU 106 refers to information 503 through 506 of a cropped area of the image, information 507 through 512 of the arrangement of the image, and the template type 403 so as to produce the print data from the original image 203 of the image file 200.

Then, the CPU 106 instructs a printer driver so that the printer driver performs a print processing based on the produced print data, via the OS. The album creation apparatus 100 is connected with a printer apparatus via a communication cable or through a wireless communication. The printer apparatus, upon receipt of instruction from the printer driver of the album creation apparatus 100, performs printing of the album based on the print data that is rendered by the printer driver.

When the user presses an "order through network" button 804, the CPU 106 connects the apparatus to a network via the network interface 111. Then, the CPU 106 produces the print data in the same manner as the case where the user presses the print button 803. Then, the CPU 106 accesses a web server of an online print shop, and then sends the produced print data to the web server. The web server sends web page information that defines an input form of information necessary for ordering the album, to the album creation apparatus 100. Then, the album creation apparatus 100 activates a web browser so as to display the input form based on the web page information. The user inputs order information including a number of copies of the album, an address of a distribution destination, the name of the user, and credit information of the user, according to the input form. Then, the album creation apparatus 100 sends the order information to the web server through the web browser. The web server performs the print processing of the album based on the print data and the order information. In addition, an operator of the web server performs bookbinding and distribution of the printed album.

When the user presses a return button 805, the CPU 106 returns the display in the display device 101 to the album editing screen 600.

FIG. 9 illustrates a warning management table 900 that manages threshold value data. The album creation apparatus 100 according to this exemplary embodiment performs control to determine with the threshold value whether a warning should be issued when the images placed on the album mutually overlaps. The warning management table 900 is stored in the hard disk 109.

In this exemplary embodiment, the CPU 106 manages an overlapping ratio 901 for warning-determination by using the warning management table 900.

In this exemplary embodiment, when it is determined that the same images are used in two image areas in the album, a ratio of an area (ratio of overlapping) of the image displayed in each image area is computed. The image overlapping ratio 901 for warning-determination is a threshold value of the overlapping ratio used for determining whether a warning that the same images are used in the album should be issued to the user.

Figure 10:
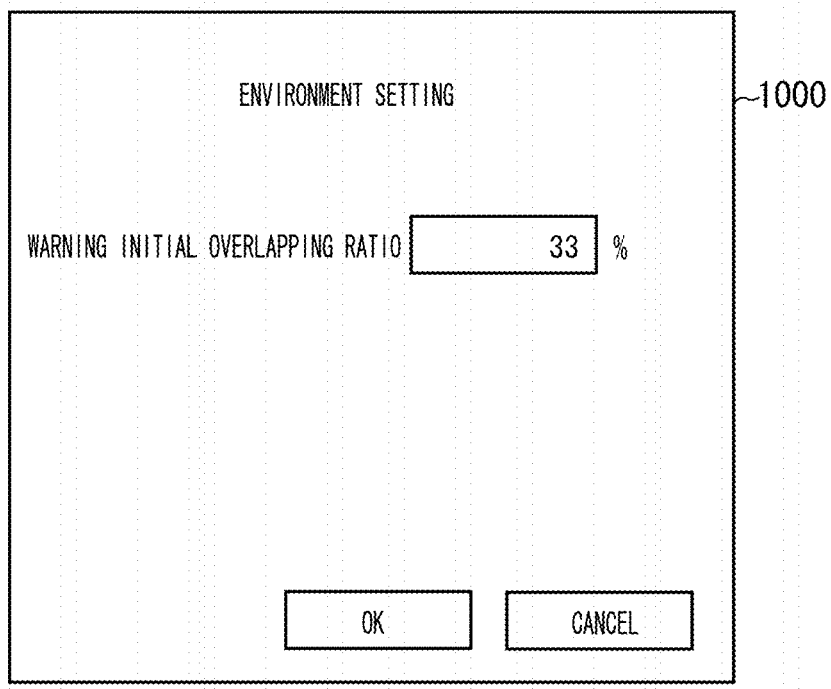
FIG. 10 illustrates one example of an environment setting screen that is displayed on the display device of the album creation apparatus according to the exemplary embodiment of the present invention.

With respect to the image overlapping ratio 901 for warning-determination, a value that is previously set as a fixed value by the album creation program can be stored by the album creation apparatus 100 in the RAM 108 or the hard disk 109. Alternatively, the user can freely set the value in an environment setting screen as shown in FIG. 10, which the CPU 106 displays on the display device 101 according to the album creation program.

FIG. 11 illustrates the page management table 1100 that is used by the album creation apparatus 100 in managing the number of pages of the album.

The album creation apparatus 100 manages a number 1101 of two-page-spreads, a number 1102 of the currently-edited two-page-spreads that is displayed in the page editing area 601, and the album ID 1103 of the album in which the page is included.

Here, values that are stored in the number 1101 of two-page-spreads are described. First, the album creation apparatus 100 determines a page including the top cover and a back cover to be a first two-page-spread, and determines a two-page-spread including a back page of the top cover and page 1 to be a second two-page-spread. Then, in the case of an album of ten pages in total, for example, four two-page-spreads including "pages 2 and 3", "pages 4 and 5", "pages 6 and 7", and "pages 8 and 9", respectively, are managed as third through sixth two-page-spreads. A two-page-spread that includes page 10 and a back page of the back cover is managed as a final, seventh two-page-spread. Accordingly, in the case of the album of ten pages in total, seven two-page-spreads are included in total. Thus, a value "7" is set to the number 1101 of two-page-spreads.

When a two-page-spread that is to be newly edited is selected in the page selection area 602 of the album editing screen 600 described above and a new two-page-spread is displayed in the page editing area 601, the page number of the displayed two-page-spread is set in the number 1102 of the currently edited two-page-spread.

FIG. 12 illustrates the page image management table 1200 that manages information about the images to be placed in each two-page-spread of the album produced by the album creation apparatus 100. A number of records equivalent to the number of two-page-spreads included in the album are stored in the page image management table 1200.

In each two-page-spread, a two-page-spread number 1201, a number 1202 of images (a number of image areas) within a page, and an image number 1203 of a first image in the page are stored. When the user selects the image adding button 604 for a two-page-spread in the album editing screen 600, the CPU 106 adds a value "1" to the number of images 1202 within the two-page-spread. Then, the CPU 106 acquires the record of the image in each of following two-page-spreads, and adds a value "1" to the first image number 1203. On the other hand, when the image erasing button 605 for a two-page-spread is selected in the album editing screen 600, the CPU 106 subtracts a value "1" from each of the number of images 1202 within a page and the first image number 1203.

When the user selects the image adding button 604 for a two-page-spread in the album editing screen 600, the CPU 106 adds a value "1" to the image ID 501 of all the records in the image management table 500 that belong to the pages following the concerned page. After that, the CPU 106 newly produces one record in the image management table 500, and then produces a record having a value "maximum image ID (of the image management table)+1" for the image ID. On the other hand, when the user selects the image erasing button 605 for a two-page-spread in the album editing screen 600, the CPU 106 erases the record of the concerned image ID and subtracts a value "1" from the image ID 501 as to all of following records that have the image ID 501. In the image management table 500, a number of the records exist which is equivalent to the number of images included in the album.

Next, a flow for confirming whether the same images are used in a plurality of parts in the album, and notifying a warning is described with reference to FIG. 13.

According to this exemplary embodiment, the processing as shown in FIG. 13 starts when the processing selection screen 800 is displayed in response to the pressing of the "next" button 608 in the album editing screen 600, and any of the buttons 801 through 804 for instructing various kinds of processing is selected by the user.

Note that when the "next" button 608 is pressed by the user in the album editing screen 600, the CPU 106 does not display the album editing screen 600 or displays the album editing screen 600 in a state in which the album editing is not possible, and ends the album editing processing.

FIG. 13 illustrates a flow chart of the processing by which the album creation apparatus 100 according to this exemplary embodiment determines whether the images overlap in one album considering the cropped area of the image. Thus, the control is performed to determine whether a warning to that effect should be issued. Each step is performed by the CPU 106 according to the album creation program.

First, in step S1301, the CPU 106 computes a total number N of the images that are used in the album. The number of images used in the album is equivalent to the number of the image areas used in the album. Accordingly, the CPU 106 reads from the hard disk 109 the number 1202 of image areas from each record of the two-page-spread stored in the page image management table 1200. CPU 106 adds each read-out number 1202 of image areas so as to compute the total number N of the images. Alternatively, the total number N of the images can be computed by acquiring the total number of records of the album that have the album ID 514, from among the records managed by the image management table 500 as shown in FIG. 5.

Then, in step S1302, the CPU 106 acquires the image overlapping ratio 901 for warning-determination from the warning management table 900 that is stored in the hard disk 109, so as to substitute the acquired ratio for a permissible overlapping ratio P.

Then, in step S1303, the CPU 106 initializes a work parameter I for counting the number of images with a value "1".

Then, in step S1304, the CPU 106 compares the work parameter I with the total number N of images to determine whether the work parameter I is less than the total number N. If the work parameter I is less than the total number N of images, the CPU 106 performs the processing following step S1305. If the work parameter I is equal to the total number N of images, the CPU 106 ends the processing.

Then, in step S1305, the CPU 106 initializes a work parameter J to count the number of the images with a value "I+1". The work parameter J is compared with the total number N of images, as described below.

Then, in step S1306, the CPU 106 determines whether the work parameter J is equal to or less than the total number N of images. If it is determined that the work parameter J is equal to or less than the total number N of images, the processing shifts to a flow of step S1307 and beyond for comparison to determine whether the same images are used in two image areas. If it is determined that the work parameter J is greater than the total number N of images, the processing shifts to step S1315. In step S1315, the CPU 106 adds a value "1" to the work parameter I, and then returns the processing to step S1304.

In step S1307, the CPU 106 checks if an I-th image and a J-th image are included in the same image file. More specifically, the CPU 106 acquires the record of the image that is placed I-th from the first page of the album. Then, the CPU 106 acquires the image file name 502 as the attribute information, based on the acquired record of the I-th image. In addition, the CPU 106 acquires information 503, 504, 505, and 506 of the rectangle of the cropped area of the image. Similarly, the CPU 106 can acquire the information about the record of the J-th image. Here, the CPU 106 compares the image file name 502 of the acquired records of the images with each other so as to determine whether the image file of the I-th image and the image file of the J-th image are the same.

In this exemplary embodiment, it is determined whether the image file of the I-th image and the image file of the J-th image are the same, based on a result of comparison between the image file names 502. However, the CPU 106 can be configured to acquire the image file 200 based on the image file path 513 thereof and acquire each original image 203 for comparison as to whether the binary data thereof are the same. Because the comparison of the binary data takes too much time in the case of large-size original images 203, instead, the binary data of the thumbnail images 202 can be compared. The thumbnail images 202 can be previously stored in the image files 200, or otherwise, a reduced image of a specific size can be previously produced for use in comparison. The processing for comparing the image files can be speeded up by converting pixel information of the original image 203 or the thumbnail image 202 into hash values with a specific algorithm and comparing the hash values.

If it is determined that the I-th image and the J-th image are included in the same image file in step S1307, the CPU 106 determines that the I-th and the J-th images should be subjected to the determination process about overlapping, and then the CPU 106 shifts the processing to step S1308. If it is determined that the I-th and the J-th images are included in different image files in step S1307, the CPU 106 terminates the processing for comparing the images and shifts the processing to step S1314.

In step S1308, the CPU 106 computes an overlapping area with respect to the I-th and the J-th images. The overlapping area can be computed by following expressions.

$$SX = \max(SIX, SJX)$$

$$SY = \max(SIY, SJY)$$

$$EX = \max(\min(EIX, EJX), SX)$$

$$EY = \max(\min(EIY, EJY), SY)$$

where coordinates of the cropped area of the I-th image are (SIX, SIY) and (EIX, EIY) at upper left and lower right corners thereof respectively; coordinates of the cropped area of the J-th image are (SJX, SJY) and (EJX, EJY) at upper left and lower right corners thereof respectively; coordinates of the overlapping area are (SX, SY) and (EX, EY) at upper left and lower right corners thereof respectively; "max" is the larger of the values described in the round brackets; and "min" is the smaller of the values described in the round brackets.

In step S1309, the CPU 106 computes a ratio R(I) of the overlapping area computed by step S1308 in the cropped area of the I-th image by a following expression.

$$R(I) = ((EX-SX) \times (EY-SY))/((EIX-SIX) \times (EIY-SIY))$$

In step S1310, the CPU 106 computes a ratio R(I) of the overlapping area computed by step S1308 in the cropped area of the J-th image by a following expression.

$$R(J) = ((EX-SX) \times (EY-SY))/((EJX-SJX) \times (EJY-SJY))$$

In step S1311, the CPU 106 acquires the overlapping ratio R by a following expression.

$$R = \min(R(I), R(J))$$

In this exemplary embodiment, the computation of the overlapping area, and the ratio of overlapping in the image are performed using the rectangle as a reference, regardless of whether the shape of the cropped area is a rectangle or an oval. However, the embodiment is not limited to this configuration. That is, if the shape of the cropped area is an oval, detailed area computation can be performed.

In step S1312, the CPU 106 compares the overlapping ratio R with the permissible overlapping ratio acquired by step S1302. In this exemplary embodiment, if the overlapping ratio R is less than the permissible overlapping ratio P, the overlapping area in the cropped area of the image is small with respect to the I-th and the J-th images. Accordingly, the warning that the I-th and the J-th images are the same, is not issued to the user. Therefore, if the overlapping ratio R is less than the permissible overlapping ratio P, the CPU 106 shifts to step S1314, as a next step.

Figure 14:
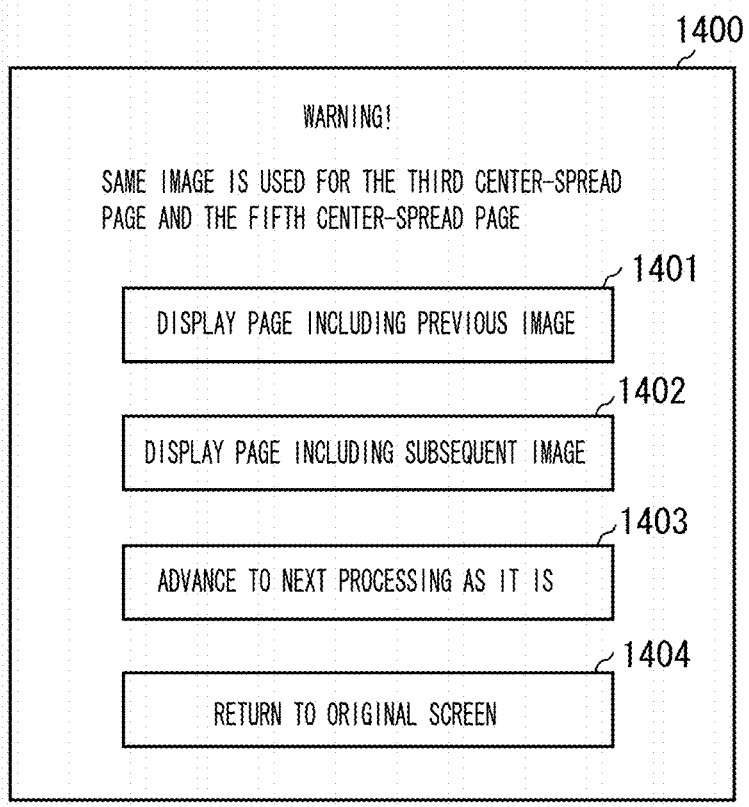
FIG. 14 illustrates one example of a warning screen that is displayed on the display device of the album creation apparatus according to the exemplary embodiment of the present invention.

On the other hand, if the overlapping ratio R is not less than the permissible overlapping ratio P, a warning that the same images are displayed in plural different positions, is issued. The CPU 106 displays a warning screen 1400 as shown in FIG. 14 in step S1313. The CPU 106 refers to the page image management table 1200 and computes the page number of the two-page-spread in which the I-th image and the J-th image are included, and displays the computed page number on the warning screen 1400.

FIG. 14 illustrates the warning screen 1400 that the CPU 106 displays on the display device 101 in step S1313 when it is determined that there is an overlapping image in step S1312. When the user presses a button 1401, the CPU 106 returns the display on the display device 101 to the album editing screen 600 and displays the two-page-spread that includes the I-th image on the page editing area 601. When the user presses a button 1402, the CPU 106 returns the display on the display device 101 to the album editing screen 600 and displays the two-page-spread that includes the J-th image, on the page editing area 601. When the user presses a button 1403, the CPU 106 determines that the overlapping is ignored, and performs a next processing such as the print processing. When the user presses a button 1404, the CPU 106 returns the display on the display device 101 to the processing selection screen 800.

In step S1314, the CPU 106 adds a value "1" to the work parameter J, and returns the processing to step S1306.

The processing is continuously performed and it is determined whether the image is used in an overlapping manner based on the overlapping ratio of the cropped portion of the image placed on the album. Whether the warning as to the overlapping is issued, can be controlled based on the result of the determination.

In this exemplary embodiment, the example is described with reference to FIG. 13 in which all the images are checked as to overlapping, using the instructions of various processing in the processing selection screen 800 as a trigger which are issued after the completion of the editing processing of the album. However, the embodiment is not limited to this configuration.

For example, the trigger can be the selection of a new two-page-spread in the page selection area 602 of the album editing screen 600. In this case, the CPU 106 starts the processing as shown in FIG. 13 so that it can be checked whether the image in the two-page-spread currently displayed in the page editing area 601 overlaps with the image in other two-page-spread. In addition, the CPU 106 acquires in step S1303 an initial value of the work parameter I from the first image number 1203 of the two-page-spread currently displayed in the page editing area 601. Then, the CPU 106 makes the determination in step S1304 based on whether the work parameter I has reached the value obtained by adding the number of the images 1202 in the two-page-spread to the first image number 1203 of the current two-page-spread. In this case, in order to perform a comparison between each image in the two-page-spread and all other images in the album for overlapping, the CPU 106 initializes the work parameter J set by step S1305 with a value "1". Then, when it is determined whether the I-th image and the J-th image are the same image in step S1307, the CPU 106 checks whether the numbers "I" and "J" are not the same and whether the image files of the I-th image and the image file of the J-th image are the same.

In addition, the pressing of the OK button 704 in the image editing screen 700, for example, can also be the trigger. In this case, the image ID of the image currently displayed in the image editing area 701 is set as the initial value of "I" that is substituted in step S1303. Then, the determination in step S1304 can be made based on whether the work parameter I has reached the value obtained by adding a value "1" to the value of the image ID of the image that is currently displayed. Then, the CPU 106 performs the same processing as in the case of the album editing screen 600.

In this exemplary embodiment, by performing the processing described above, it is determined whether the same image is used in an overlapping manner, based on the overlapping ratio of the cropped area of the image placed on the album. Accordingly, even if the same image is used in an overlapping manner, when different portions of the same image are placed in the page of the album, the CPU does not issue a warning, recognizing that the same image is intentionally used. Thus, the creator of the album does not receive an unnecessary warning.

Accordingly, the creator of the album can receive only an appropriate warning, without suffering an inconvenience of responding to an unnecessary warning. Thus, the effectiveness of creating an album can be improved.

In addition, in this exemplary embodiment, the determination as to the overlapping of the images is made after the images are captured into the electronic album, for example, when the editing processing of the album is completed, when a new two-page-spread is selected, or when the editing processing of the image is completed. That is, the determination as to the overlapping is made to the images and album edited after the images are captured into the electronic album. Accordingly, the warning can be issued reflecting a result of editing by the user, and thus the user does not obtain a print product and a preview of an album created by mistakes.

Further, in this exemplary embodiment, in issuing warning of overlapping of images, the notification as to the page of the overlapping image is issued together with the warning. Accordingly, the user can easily notice and understand the warning.

Second Exemplary Embodiment

In the second exemplary embodiment of the present invention, the description is made as to processing for determining whether the images placed on the album overlap with each other, in the case where the images subjected to editing such as magnification and reduction are displayed in the pages of the album. The portions that are the same as those in the first exemplary embodiment are provided with same reference numerals and symbols and are not described here. The points different from the first exemplary embodiment are described in detail in this exemplary embodiment.

Figure 15:
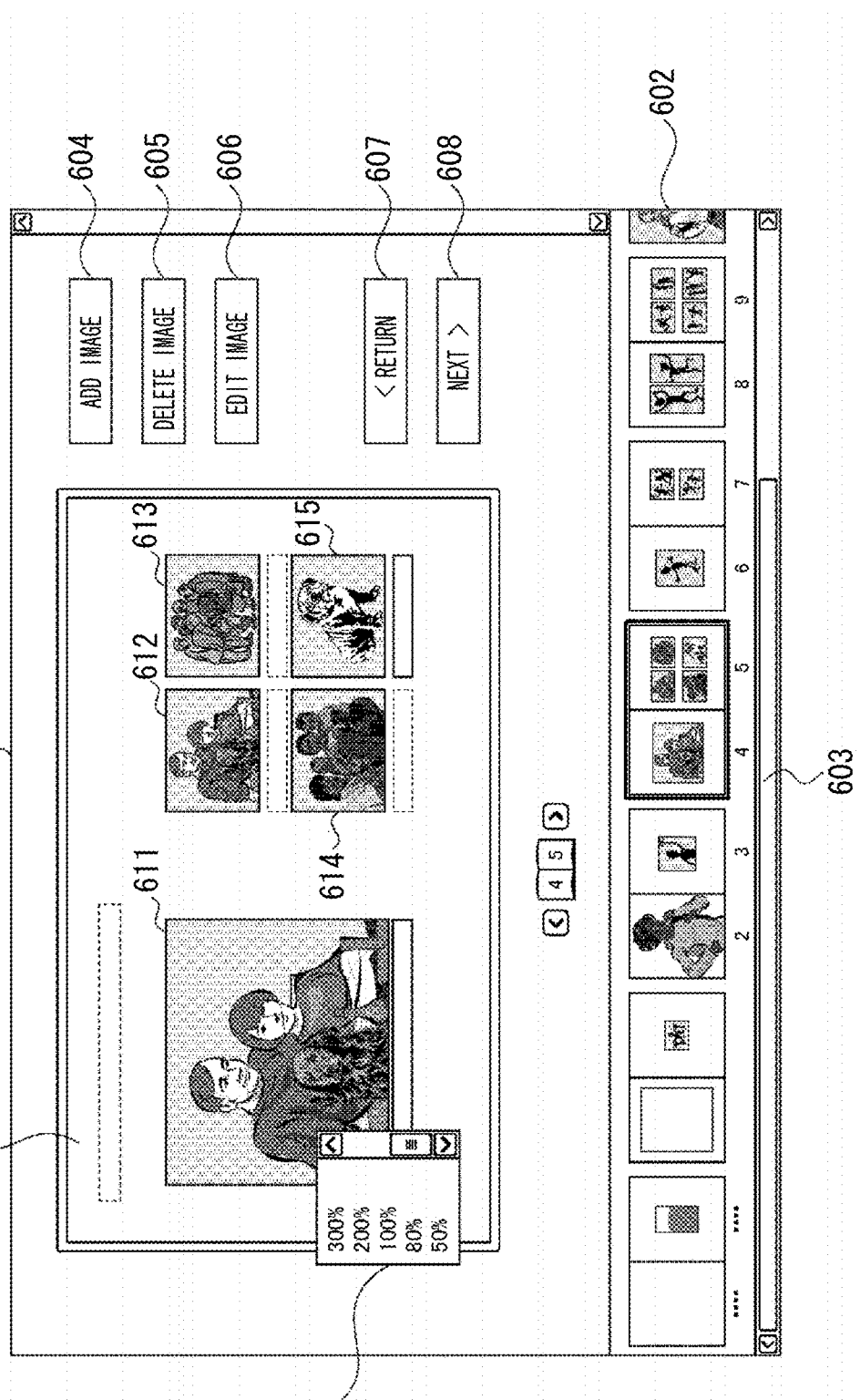
FIG. 15 illustrates one example of an album editing screen that is displayed on the display device of the album creation apparatus according to the exemplary embodiment of the present invention.

FIG. 15 illustrates an album editing screen 1500 displayed on the display device 101 of the album creation apparatus 100 according to this exemplary embodiment. The user issues an instruction to magnify or reduce an image as an editing instruction. The other portions are the same as those in the album editing screen 600 of the first exemplary embodiment. The image is magnified or reduced according to the magnification ratio input in a magnification entry field 1501 in the album editing screen 1500 so as to display the magnified or reduced image in the page editing area 601.

Figure 16:
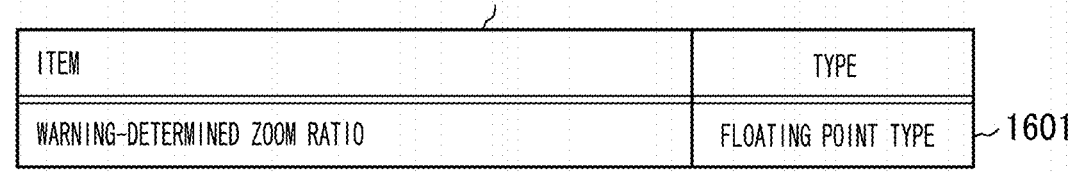
FIG. 16 schematically illustrates the warning management table that is stored in the hard disk of the album creation apparatus according to the exemplary embodiment of the present invention.

FIG. 16 illustrates a warning management table 1600 that manages a threshold value. The warning management table 1600 performs control to check whether the album creation apparatus 100 should issue a warning when the images placed on the album overlap. The warning management table 1600 is stored in the hard disk 109.

In this exemplary embodiment, the CPU 106 manages a zoom. ratio 1601 for warning-determination by using the warning management table 1600.

In this exemplary embodiment, when it is determined that the same images are used in two image areas in the album, the ratio of display magnification (zoom ratio) of the image displayed in each area is computed. The zoom ratio 1601 for warning-determination is a threshold value of the zoom ratio that is used for determining whether the warning that the same images are used should be issued to the user.

With respect to the zoom ratio 1601 for warning-determination, a value that is previously set as fixed by the album creation program can be stored by the album creation apparatus 100 in the RAM 108 or the hard disk 109. Just as in the case of the first exemplary embodiment, the user freely sets the values in an environment setting screen as shown in FIG. 10, which the CPU 106 displays on the display device 101 according to the album creation program. The values can be used for the zoom ratio 1601 for warning-determination.

Figure 17:
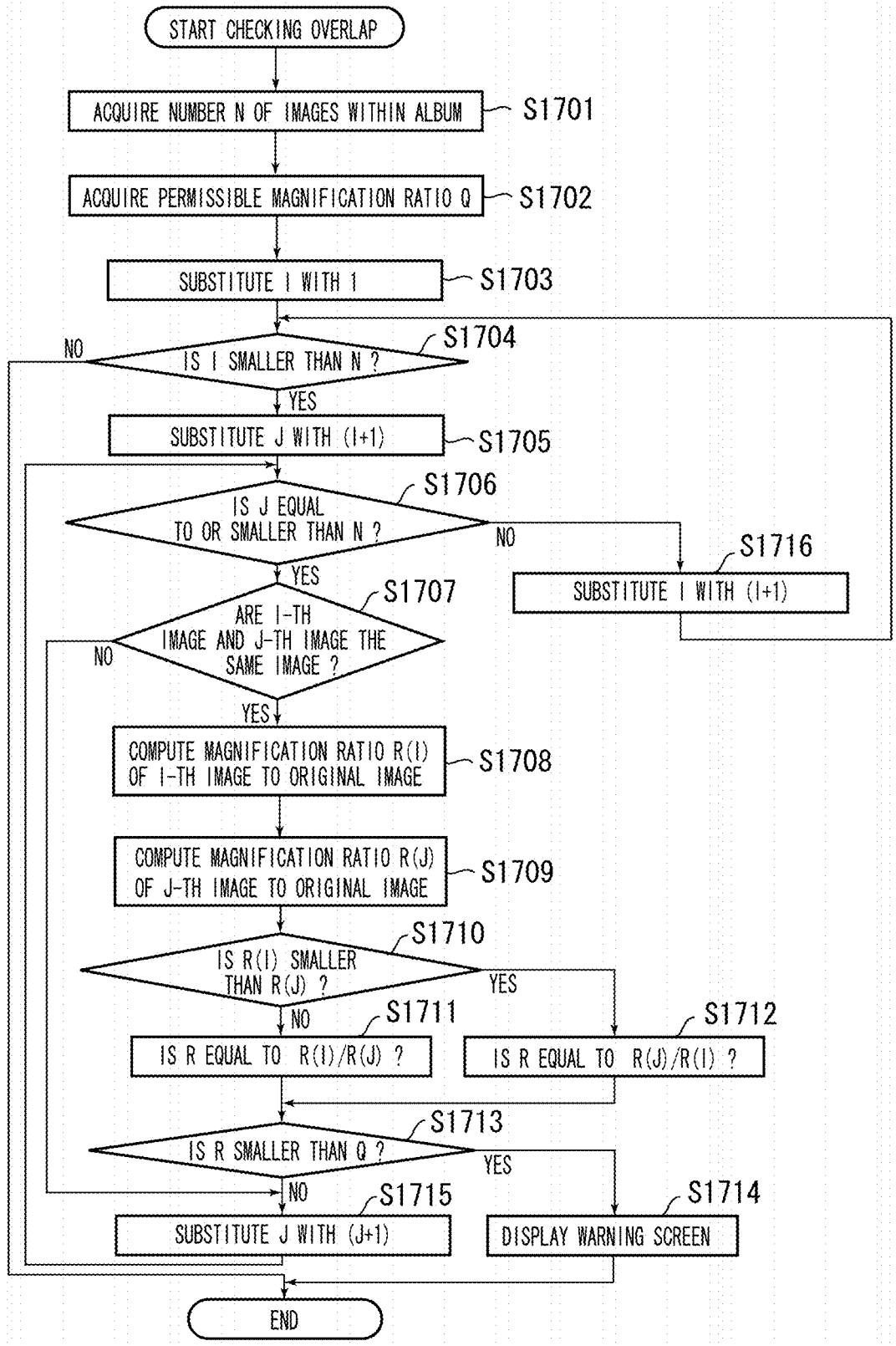
FIG. 17 is a flow chart that illustrates a procedure in which the album creation apparatus according to the exemplary embodiment of the present invention determines whether the images in the album are used in an overlapping manner and issues a warning to that effect.

FIG. 17 illustrates a flow chart of the processing for determining whether the warning as to the overlapping of images should be issued considering the display magnification of the images placed on the album. Each step is performed by the CPU 106 according to the album creation program.

First, in step S1701, the CPU 106 computes the total number N of images used in the album. The processing is the same as the processing by step S1301 as shown in FIG. 13 in the first exemplary embodiment.

Then, in step S1702, the CPU 106 acquires a permissible magnification ratio 1601 from the warning management table 1600 stored in the hard disk 109, and substitutes the acquired permissible magnification ratio 1601 for a permissible magnification ratio Q.

Then, in step S1703, the CPU 106 initializes the work parameter I for counting the number of images, with a value "1".

Then, in step S1704, the CPU 106 makes comparison to determine whether the work parameter I is less than the total number N of images. When the work parameter I is less than the total number N of images, the CPU 106 performs the processing following step S1705. When the work parameter I becomes equal to the total number N of images, the CPU 106 ends the processing.

Then, in step S1705, the CPU 106 initializes a work parameter J for counting the number of the images with a value "I+1". The work parameter J is compared with the total number N of images, as described below.

Then, in step S1706, the CPU 106 determines whether the work parameter J is equal to or less than the total number N of images. If it is determined that the work parameter J is equal to or less than the total number N of images, the processing shifts to a flow of step S1707 and beyond for comparison to determine whether the same images are used in two image areas. If it is determined that the work parameter J is greater than the total number N of images, the processing shifts to step S1716. In step S1716, the CPU 106 adds a value "1" to the work parameter I, and then returns the processing to step S1704.

In step S1707, the CPU 106 checks if the I-th image and the J-th image are included in the same image file. This processing is the same as the processing in step S1307 as shown in FIG. 13 in the first exemplary embodiment.

If it is determined that the I-th image and the J-th image are included in the same image file in step S1707, the CPU 106 shifts the processing to step S1708. If it is determined that the I-th and the J-th images are included in different image files in step S1707, the CPU 106 terminates the processing for comparing the images and shifts the processing to step S1715.

Then, in step S1708, the CPU 106 computes the magnification ratio R (I) for the original image of the I-th image. More specifically, the CPU 106 searches the image management table 500 for the record that concerns the I-th image, and acquires an upper-left position (SX, SY) and a lower-right position (EX, EY) for display of the image. Here, "SX" denotes the leftmost position 509 of the area, "SY" denotes the uppermost position 511 of the area, "EX" denotes the rightmost position 510 of the area, and "EY" denotes the lowermost position 512 of the area. Then, the CPU 106 acquires the leftmost pixel 503, the uppermost pixel 505, the rightmost pixel 504, and the lowermost pixel 506 of the cropped portion of the I-th image. The magnification ratio R(I) can be computed by a following expression.

$$R(I)=(EX-SX)/(EIX-SIX)$$

where coordinates of the cropped area of the I-th image are (SIX, SIY) and (EIX, EIY) at upper left and lower right corners respectively. In this exemplary embodiment, the magnification ratio is taken in the X-axis direction, however, the same values can also be obtained if the magnification ratio is taken in the Y-axis direction.

In step S1709, the CPU 106 computes the magnification ratio R(J) for the original image of the J-th image. The method of computation is the same as step S1708. That is, the magnification ratio R(J) can be computed by the following expression.

$$R(J)=(EX-SX)/(EJX-SJX)$$

where coordinates of the cropped area of the J-th image are (SJX, SJY) and (EJX, EJY) at upper left and lower right corners respectively.

Then, in step S1710, the CPU 106 compares the magnification ratio R(I) computed by step S1708 with the magnification ratio R(J) computed by step S1709. If the magnification ratio R(I) is less than the magnification ratio R(J), the CPU 106 computes a ratio R of the magnification ratio of the J-th image to the I-th image by the following expression in step S1712.

$$R=R(J)/R(I)$$

On the other hand, if the magnification ratio R(I) is equal to or greater than the magnification ratio R(J), the CPU 106 computes the ratio R of the magnification ratio of the J-th image to the I-th image by the following expression instep S1711.

$$R=R(I)/R(J)$$

Then, in step S1713, the CPU 106 determines whether the ratio R of the magnification ratios is less than the permissible magnification ratio Q that is computed by step S1702. If it is determined that the ratio R of the magnification ratios is less than the permissible magnification ratio Q, the image displayed at approximately the same magnification exists in other image area. Accordingly, the CPU 106 shifts the processing to step S1714 and displays the warning screen 1400, just as in the first exemplary embodiment. The processing is the same as the processing by step S1313 as shown in FIG. 13 in the first exemplary embodiment.

On the other hand, if it is determined that the ratio R of the magnification ratios is equal to or greater than the permissible magnification ratio Q, the images are displayed in a plurality of image areas at different magnifications. Accordingly, it can be determined that the user intentionally uses the images of the same image file, and thus the CPU 106 shifts the processing to step S1715.

In step S1715, the CPU 106 adds a value "1" to the work parameter J, and then returns to step S1706.

The processing is continuously performed and it can be determined whether the same images are used in the plural image areas, based on the display magnification of the images. Whether the warning as to the overlapping use of the images is issued, can be controlled based on the result of the determination.

In this exemplary embodiment, the example is described with reference to FIG. 17 in which all the images are checked for overlapping, using the completion of the editing processing of the album as a trigger. However, the embodiment is not limited to this configuration.

For example, the trigger can be the selection of a new two-page-spread in the page selection area 602 of the album editing screen 600. In this case, the processing can be changed so that the CPU 106 checks if the image in the two-page-spread currently displayed in the page editing area 601, overlaps with the image in other two-page-spread. The CPU 106 acquires in step S1703 an initial value of the work parameter I from the first image number 1203 of the two-page-spread currently displayed in the page editing area 601. Then, the CPU 106 makes the determination in step S1704 based on whether the work parameter I has reached the value which is obtained by adding the number 1202 of the images in the two-page-spread to the first image number 1203 of the current two-page-spread. In this case, in order to perform a comparison between each image in the two-page-spread and all the other images in the album for overlapping, the CPU 106 initializes the work parameter J set in step S1705 for which a value "1" is substituted. Then, in determining whether the I-th image and the J-th image are the same image instep S1707, the CPU 106 checks whether the numbers "I" and "J" are not the same and whether the image file of the I-th image and the image file of the J-th image are the same.

In addition, the pressing of the OK button 704 in the image editing screen 700, for example, can also be the trigger. In this case, the image ID of the image currently displayed in the image editing area 701 is set as the initial value which is substituted for "I" substituted in step S1703. Then, the determination in step S1704 can be made based on whether the work parameter I has reached the value which is obtained by adding a value "1" to the value of the image ID of the image currently displayed. Then, the CPU 106 performs the same processing as in the case of the album editing screen 600.

In this exemplary embodiment, by performing the processing described above, the warning that there are images that are used in an overlapping manner, can be issued to the creator of the album considering the display magnification of the images placed on the album. Accordingly, even if the same images are used in an overlapping manner, when different portions of the same image are placed in the page of the album, the CPU does not issue a warning, determining that the same image is intentionally used. Thus, the creator of the album does not receive an unnecessary warning.

Third Exemplary Embodiment

In the first and the second exemplary embodiments, the example is described with reference to FIGS. 13 and 17 in which all the images are checked for overlapping using the instructions of various processing in the processing selection screen 800 as a trigger which are issued after the completion of the editing processing of the album. I this exemplary embodiment, the case is described where the images are checked for overlapping while the creator of the album performs the editing of the album. The portions that are the same as those in the first and the second exemplary embodiments are provided with same reference numerals and symbols and are not described here. The points different from the first and the second exemplary embodiments are described in a detailed manner in this exemplary embodiment.

The CPU 106 periodically starts the processing as shown in FIG. 13. In the processing, while the display device 101 displays the album editing screen 600, it is checked whether the portion of the image currently displayed in the page editing area 601 overlaps with other image displayed on the page of the album. Alternatively, the CPU 106 periodically starts the processing as shown in FIG. 13 so that while the display device 101 displays the image editing screen 700, it is checked whether the portion of the image currently displayed in the rectangular area 706 overlaps with other image displayed on the page of the album.

Thus, the creator of the album can immediately know whether there is an overlapping image while performing the editing of the album and the cropping of the image.

In this exemplary embodiment, the warning can be issued by displaying an icon for attracting an attention of the user around the image in the page editing area 601 in step S1313 as shown in FIG. 13. Alternatively, the warning can be issued by displaying an icon for attracting an attention of the user, in the image editing screen 700 in step S1714 as shown in FIG. 17. Thus, the user does not need to respond to the warning screen 1400 as shown in FIG. 14 while editing the images and the album.

Fourth Exemplary Embodiment

In this exemplary embodiment, the case is described where the images are checked for overlapping considering in which two-page-spread the images to be mutually compared, is placed. The portions that are the same as those in the first and the second exemplary embodiments are provided with same reference numerals and symbols and are not described here. The points different from the first and the second exemplary embodiments are described in a detailed manner in this exemplary embodiment.

If it is determined in step S1307 as shown in FIG. 13 that the image file of the I-th image and the image file of the J-th image are the same, the CPU 106 refers to the page image management table 1200 so as to determine whether the image file of the I-th image and the image file of the J-th image are placed in the same two-page-spread. The same applies to the processing in step S1707 as shown in FIG. 17.

Then, if it is determined that the image file of the I-th image and the image file of the J-th image are not placed in the same two-page-spread, the CPU 106 performs the processing of step S1308 and beyond as shown in FIG. 13 or step S1708 and beyond as shown in FIG. 17.

It is likely that the creator of the album recognizes the overlapping of the images placed on the same two-page-spread while referring to the page editing area 601, and accordingly, it can be assumed that the creator of the album intentionally used the same image in an overlapping manner. According to this exemplary embodiment, no warning is issued when the overlapping images are placed in the same two-page-spread, and thus the creator of the album does not need to respond to an unnecessary warning. On the other hand, it is less likely that the creator of the album recognizes the overlapping of the images placed on different two-page-spreads because it is difficult to check the overlapping by referring to the album editing screen 600 in this case. Thus, it is assumed that the creator of the album does not desire to intentionally use the images in an overlapping manner. Consequently, according to the present invention, the warning can be effectively issued to the creator of the album.

Alternatively, the configuration can be such that if it is determined that the I-th and the J-th images are not placed in the same two-page-spread, it is further determined whether one of the I-th and the J-th images should be placed in the first two-page-spread that includes the top cover and the back cover. If it is determined that one of the I-th and the J-th images is placed in the first two-page-spread, the CPU 106 performs the processing in step S1314 as shown in FIG. 13 and beyond, and step S1715 as shown in FIG. 17 and beyond. Because it is likely that the creator of the album uses the same image in the top and the back covers and body pages, it can be determined that the same images are intentionally used by the creator of the album. Thus, the creator of the album does not need to perform an unnecessary processing or respond to an unnecessary warning.

Fifth Exemplary Embodiment

In this exemplary embodiment, the case is described where the user edits each image displayed in the page of the album by cropping, magnification, or reduction. The editing is managed by using a flag, and the images are checked for overlapping based on the flag.

When the user performs the cropping or the rotation in the image editing screen 700 as shown in FIG. 7 and presses the OK button 704, the CPU 106 turns "on" an editing flag for the record in the image management table 500 and stores the record in the image management table 500. On the other hand, when the user presses the cancel button 705, the CPU 106 turns "off" the editing flag and stores the record in the image management table 500.

When the user performs the magnification or the reduction of the image in the album editing screen 1500 and the magnification is set to the ratio other than "100%", the CPU 106 turns "on" the editing flag for the record in the image management table 500 and stores the record in the image management table 500. On the other hand, when the magnification of the image is "100%", the CPU 106 turns "off" the editing flag and stores the record in the image management table 500.

When it is determined that the image file of the I-th image and the image file of the J-th image are the same in step S1307 as shown in FIG. 13, the CPU 106 refers to the editing flag of each record of the I-th and the J-th images in the image management table 500 stored in the hard disk 109. The same applies to the processing in step S1707 as shown in FIG. 17. If the editing flag of at least one of the records of the I-th and the J-th images is set to "on", the CPU 106 performs the processing in step S1314 as shown in FIG. 13 or step S1715 as shown in FIG. 17. On the other hand, if both editing flags of the records for the I-th and the J-th image are set to "off", the CPU 106 performs the processing in step S1313 as shown in FIG. 13 or step S1714 as shown in FIG. 17.

If any kind of editing is performed to the image, it is determined that the creator of the album intentionally uses the same images in an overlapping manner. Accordingly, according to the above configuration of this exemplary embodiment, an unnecessary warning is not issued to the creator of the album. In addition, in this embodiment, whether the image is edited or not, is easily determined by using the flag. Accordingly, a complicated computation processing and the comparison processing need not be performed and the processing load on the CPU 106 is reduced.

Sixth Exemplary Embodiment

Figure 18:
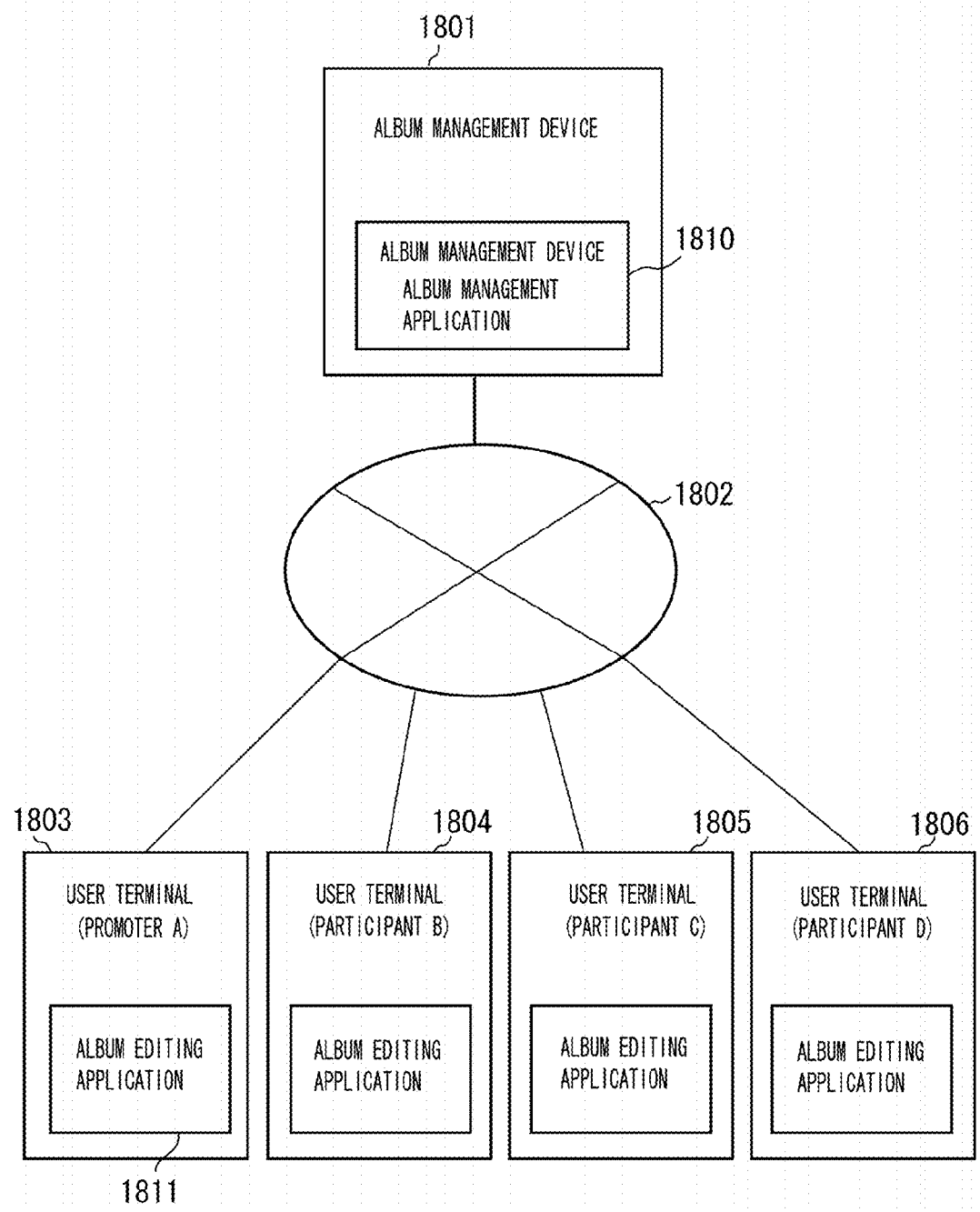
FIG. 18 illustrates one example of an overall configuration of an album creation system according to the exemplary embodiment of the present invention.

FIG. 18 illustrates an overall configuration of an album creation system that uses a network, according to the sixth exemplary embodiment of the present invention.

Referring to FIG. 18, an album management apparatus 1801 is implemented by an information processing apparatus such as a computer. The album management apparatus 1801 performs processing for managing the electronic album (hereinafter simply referred to as an "album") according to an album management application 1810. The album management apparatus 1801 is capable of communicating with external devices such as user terminals 1803 through 1806 via a network 1802.

The network 1802 connects the album management apparatus 1801 and the user terminals 1803 through 1806. The network 1802 is, for example, a network using the Internet.

The user terminals 1803 through 1806 are implemented by the information processing apparatus such as a personal computer and a portable communication apparatus. The user, using the user terminals 1803 through 1806, performs setting for creating an album, edits each page of the album, and uploads the album to the album management apparatus 1801, according to an album editing application 1811.

In this exemplary embodiment, it is assumed that the user terminal 1803 is such a type that a promoter A who proposes to create an album, utilizes. In addition, it is assumed that the promoter A who promotes the creation of the album, proposes the creation of the album to participants B, C, and D. Further, it is assumed that the user terminals 1804 through 1806 are such a type that the participants B, C, and D respectively utilize.

The information processing apparatus such as a computer that implements the album management apparatus 1801 and the user terminals 1803 through 1806 has the same configuration as shown in FIG. 1.

The hard disk 109 of the album management apparatus 1801 stores an operating system (OS), the album management application 1810, album data, album management information, and user information. The hard disk of each of the user terminals 1803 through 1806 stores the OS, a web browser, the album editing application 1811, and album data.

Figure 19:
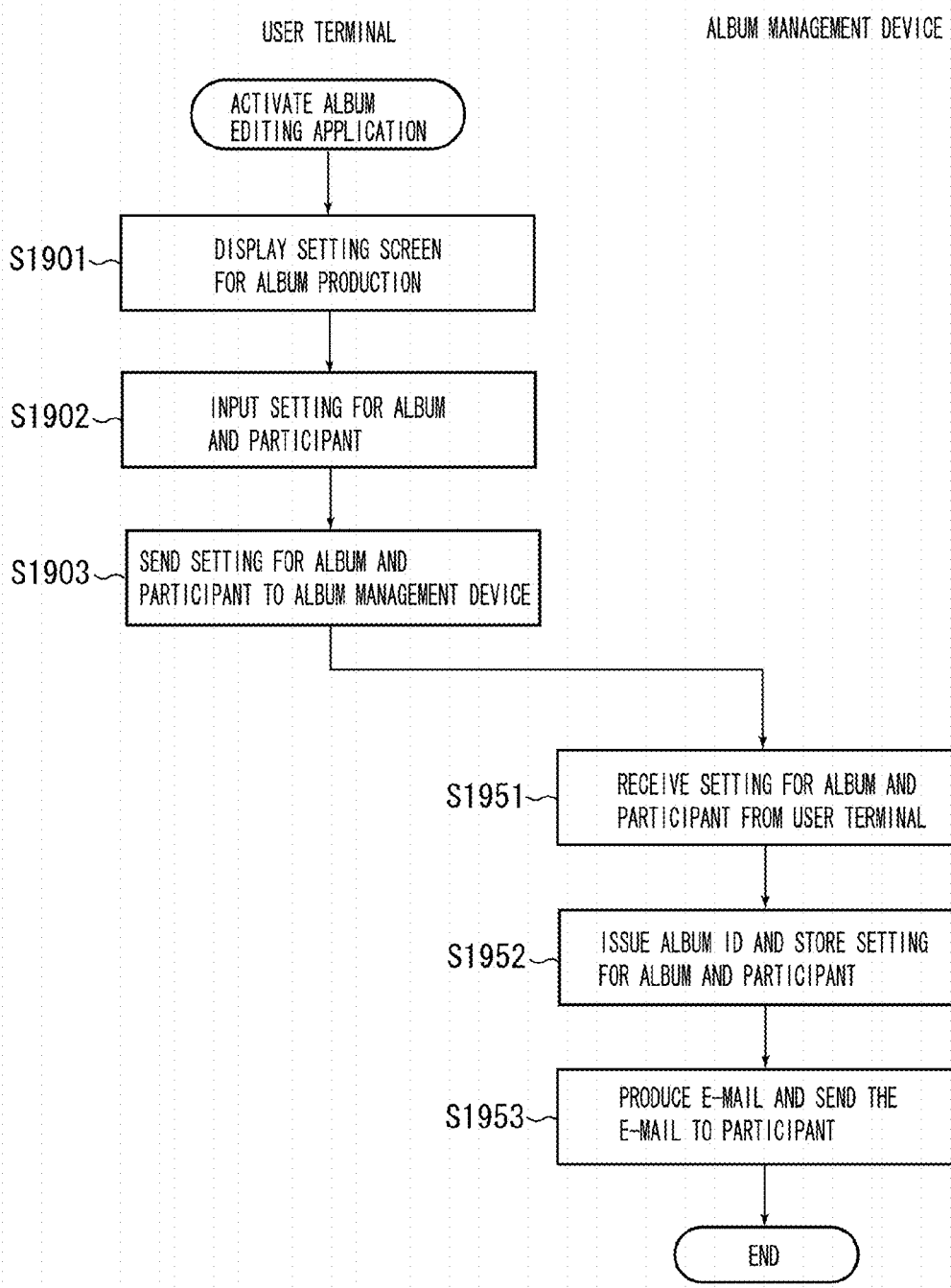
FIG. 19 is a flow chart that illustrates a procedure for notification of the creation of the album to a participant sent from a user terminal, according to the exemplary embodiment of the present invention.

First, the processing performed by the user terminal 1803 and the album management apparatus 1801 is described with reference to the flow chart of FIG. 19 which notifies the creation of the album to the participants according to the operation by the promoter A. The CPU 106 in the user terminal 1803 and the CPU 106 of the album management apparatus 1801 control the various devices described with reference to FIG. 1, according to the album editing application 111 and the album management application 1810 respectively.

The user terminal 1803 activates the album editing application 1811 and displays an initial screen on a display unit 101 of the user terminals 1803 through 1806. The promoter A operates the keyboard 104 and the pointing device 105 so as to select an album creation setting from a menu displayed on the initial screen. In response to the selection from the menu made by the promoter A, the user terminals 1803 through 1806 displays an album creation setting screen on their display unit 101 (step S1901). By the operation of the promoter A performed according to the album creation setting screen, the promoter A inputs the setting for the album such as a title of the album, a total number of pages of the album, and the template of the album. In addition, the promoter A inputs the setting for the participants such as a user name of the participant, an electronic mail address of the participant, an allocation of pages of the album to each participant, and a message described in the electronic mail address (step S1902).

Then, the user terminal 1803 sends the setting for the album and the setting for the participant input in step S1901, to the album management apparatus 1801 (step S1903).

Then, the album management apparatus 1801 receives the setting for the album and the setting for the participant from the user terminal 1803 (step S1951). Then the album management apparatus 1801 stores the settings in the hard disk 109 of the album management apparatus 1801 so as to manage the settings (step S1952). At this time, the album management apparatus 1801 issues an album ID which uniquely identifies the album to be created. The album management apparatus 1801 stores the setting as to the design of the album, the album ID 401, the album title 402, total number of pages 404, and the template type 403 received in step S1951, in the album management table 400. The album management table 400 can also store a user name of the promoter.

FIG. 20 schematically illustrates one example of a content of a participant information management table 2000 that the album management apparatus 1801 according to this exemplary embodiment manages. The participant information management table 2000 stores the setting as to the participant received in step S1951. The participant information management table 2000 is produced every time an album is newly created, and is linked with the album ID. The participant information management table 2000 stores a participant name 2001 and a participant electronic mail address 2002. Further, the participant information management table 2000 stores the record for the promoter so that the promoter A can participate in creating the album, just as the participant.

The album management apparatus 1801 refers to the participant information management table 2000 so as to produce and distribute an electronic mail (step S1953). The electronic mail includes the album ID and a message made by the promoter A. The participants B through D can obtain information concerning the creation of the album by the electronic mail.

Figure 21:
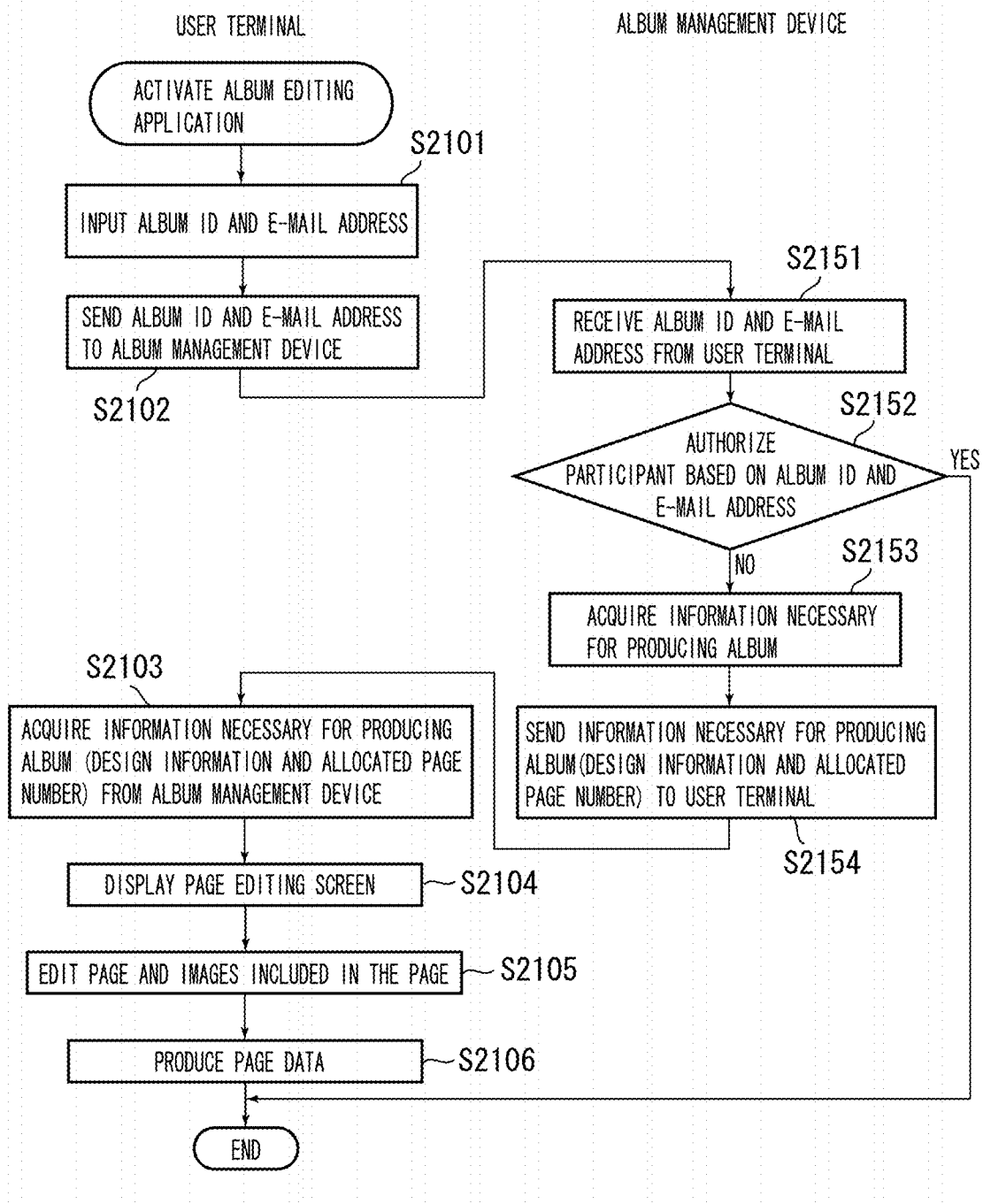
FIG. 21 is a flow chart that illustrates a procedure for producing an album page performed in the user terminal, according to the exemplary embodiment of the present invention.

Next, the processing is described which is performed in the user terminals 1804 through 1806 for producing the page of the album according to the operation performed by the participants B through D, with reference to FIG. 21. Hereinbelow, only an example of the case of the user terminal 1804 is described, however, the same applies also to the user terminals 1805 and 1806. The processing in the user terminal 1804 is performed by the CPU 106 of the user terminal 1804, which controls various modules as described with reference to FIG. 1, according to the album editing application. The processing in the album management apparatus 1801 is performed by the CPU 106 of the album management apparatus 1801 which controls various modules as described with reference to FIG. 1.

The user terminal 1804 activates the album editing application 1811 so as to display an initial screen on the display unit 101 of the user terminal 1804. The participant B operates the keyboard 104 and the pointing device 105 so as to select a "page editing" from the menu displayed on the initial screen. The user terminal 1804, in response to the selection from the menu made by the participant B, displays a participant setting screen on the display unit 101 of the user terminal 1804. The participant B inputs the electronic mail address and the album ID that is notified by the electronic mail, according to the participant setting screen (step S2101). Then, the user terminal 1804 sends the electronic mail address and the album ID that are input in the participant setting screen to the album management apparatus 1801 (step S2102).

The album management apparatus 1801 receives the electronic mail address and the album ID from the user terminal 1804 (step S2151). Then, the album management apparatus 1801 refers to the participant information management table 2000 that corresponds to the received album ID so as to authenticate the participant B based on whether the record that corresponds to the received electronic mail address, exists (step S2152). When the participant B is authenticated, the album management apparatus 1801 acquires information necessary for creating the album, from the album management table 400 (step S2153). For example, the album management apparatus 1801 acquires the album title 402, total number of pages 404, and the template type 403, based on the album ID. Further, the album management apparatus 1801 acquires the participant name stored in the participant information management table 2000 based on the album ID and the electronic mail address that are received by step S2151. Then, the album management apparatus 1801 acquires a page number 2701 allocated to the participant B from a page information management table 2700 based on the participant name. Then, the album management apparatus 1801 sends the above information necessary for creating the album, to the user terminal 1804 (step S2154).

Figure 22:
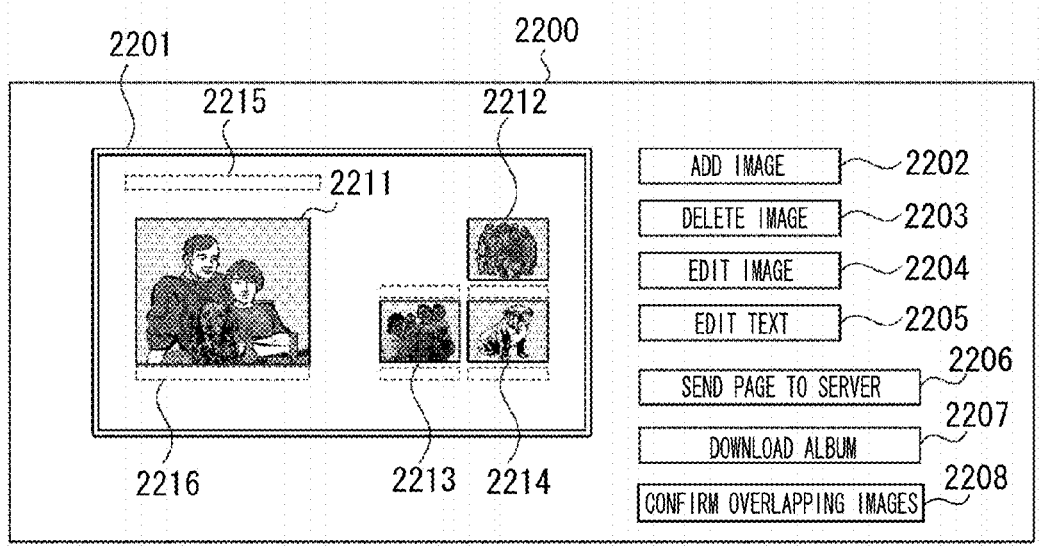
FIG. 22 illustrates one example of a page editing screen according to the exemplary embodiment of the present invention.

The user terminal 1804 receives the information necessary for creating the album from the album management apparatus 1801 (step S2103) and displays a page editing screen 2200 as shown in FIG. 22 on the display unit 101 of the user terminal 1804, based on the above information (step S2104). The page and the images are edited by the instruction issued from the participant B, according to the page editing screen 2200 and the image editing screen 700 as shown in FIG. 7 (step S2105). The result of editing is stored in the RAM 108. Finally, the user terminal 1804 produces page data based on the result of editing in step S2105 (step S2106). The page data includes the image file and the editing information.

FIG. 22 illustrates the page editing screen 2200 according to this exemplary embodiment. A page display area 2201 is a two-page-spread display area and displays one two-page-spread that is inserted into the album. A background of the image as shown in FIG. 22 is determined based on the template type 403 (FIG. 4) received in step S2103. A button 2202 is used for instructing to add the image to the two-page-spread display area 2201. The participant B specifies the image file to be added after specifying an area within the two-page-spread area 2201 by dragging the pointing device 105 and selecting an image adding button 2202. Then, in response, the user terminal 1804 adds and displays the image to the two-page-spread. A button 2203 is used to instruct an erasure of the image displayed in the two-page-spread area 2201. When the participant B selects the image erasure button 2203 after selecting the image using the pointing device 105, in response, the user terminal 1804 erases the selected image from the two-page-spread area 2201 so that the erased image is not displayed. A button 2204 instructs the editing of the image displayed in the two-page-spread area 2201. When the user selects the image editing button 2204 after selecting the image using the pointing device 105, in response, the user terminal 1804 displays the image editing screen 700 in the display 101 as shown in FIG. 7. A button 2205 edits the character string. When the participant B specifies an area using the pointing device 105 and selects the editing button 2205 for the character string, the user terminal 1804 produces an area to which a character string is added in a specified area so as to receive input of the character string. When an area 2215 is already produced and specified, the user terminal 1804 accepts the editing of the character string in the area. When an image 2211 displayed in the two-page-spread display area 2201 is specified, the user terminal 1804 accepts the editing of the character string in a character input area 2216 added to the image.

A button 2206 instructs uploading of the page data that is produced after editing, to the album management apparatus 1801. The processing performed when the button 2206 is selected, is described in detail below.

A button 2207 instructs downloading of the album data from the album management apparatus 1801. When the participant B selects the button 2207, the user terminal 1804 downloads the album data including the page data produced by the creator of the album other than himself (for example, the promoter A or the participants C and D), from the album management apparatus 1801. Then, the album management apparatus 1801 displays each page of the album on the display unit 101 according to the downloaded album data.

A button 2208 instructs the album management apparatus 1801 to confirm whether there is an image in the page data already uploaded to the album management apparatus 1801 that overlaps with the image used in the two-page-spread that is currently edited by the user terminal 1804. The processing performed when the button 2208 is pressed, is described in detail later below.

Images 2211 through 2214 are added to the two-page-spread that is currently edited, and are displayed.

In this exemplary embodiment, the participant B selects the image editing button 2204 in the page editing screen 2200. The user terminal 1804, in response to the selection, displays the image editing screen 700 on the display unit 101. In addition, the user terminal 1804, in response to pressing of the button 702 or the button 703 by the participant B, rotates the image currently edited to the left or to the right, and displays the rotated image on the display unit 101. Further, the user terminal 1804, in response to pressing of the OK button 704 by the participant B, stores the content of editing in the image editing screen 700 to the RAM 108. Then, the user terminal 1804 terminates the display of the image editing screen 700 and returns the display to the page editing screen 2200. In addition, in response to pressing of the cancel button 705 by the participant B, the user terminal 1804 cancels the editing performed in the image editing screen 700. Then, the user terminal 1804 terminates the display of the image editing screen 700 and returns the display to the page editing screen 2200.

Figure 23:
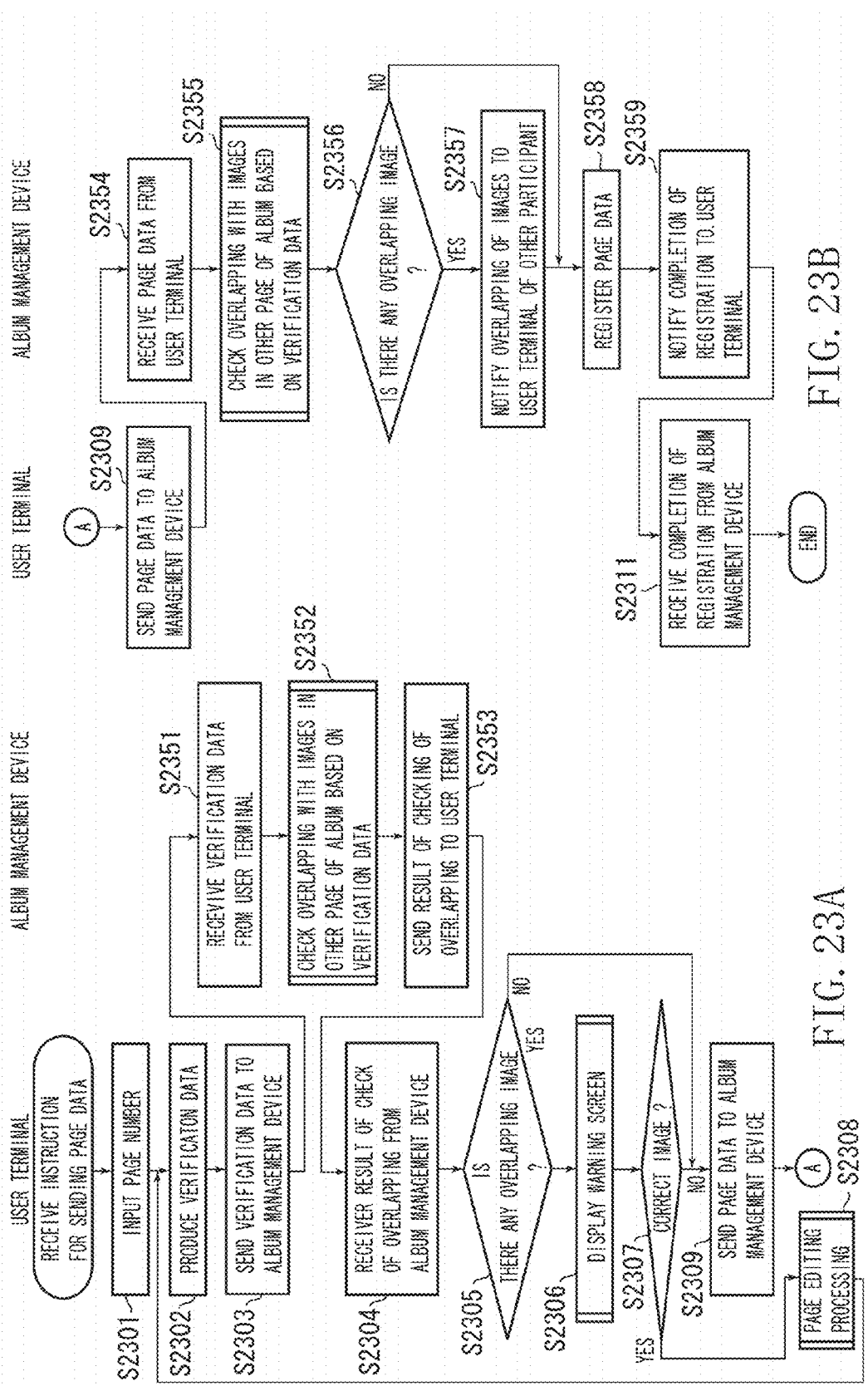
FIG. 23A and FIG. 23B are flow charts that respectively illustrate a procedure for uploading page data from the user terminal to the album management apparatus, according to the exemplary embodiment of the present invention.

Then, the procedure for uploading the page data from the user terminal 1804 to the album management apparatus 1801 is described that is performed in response to the selection of the "send" button 2206 by the participant B after editing the page, with reference to FIG. 23A and FIG. 23B. The processing described below is performed by the CPU 106 of the user terminal 1804 and the CPU 106 of the album management apparatus 1801 controlling the various devices as shown in FIG. 1, according to the album editing application 1811 and the album management application 1810 respectively.

Figure 24:
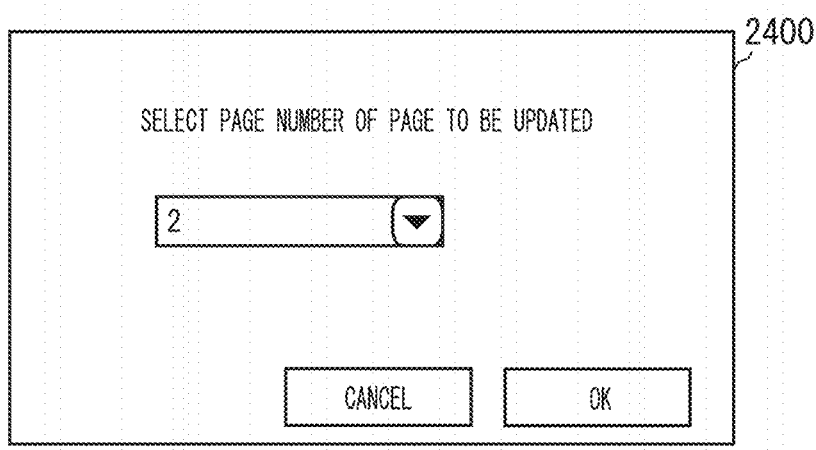
FIG. 24 illustrates one example of a page selection screen according to the exemplary embodiment of the present invention.

First, the user terminal 1804 displays a page number selection screen 2400 as shown in FIG. 24 on the display unit 101. The participant B selects the number of the page to be uploaded in the page number selection screen 2400. The page number is input to the user terminal 1804 (step S2301).

In step S2302, the user terminal 1804 produces verification data for the mage placed in the page specified in step S2301. The verification data includes the album ID, the page number, identification information of the image, and the editing information indicated by the cropped area and the rotation angle set to each image. The verification data is described by XML data as shown in FIG. 25, for example. In this exemplary embodiment, with respect to each image placed in the page, a thumbnail image having a width of 120 pixels is newly produced from the original image 203, as the identification information for the image. Instead of the thumbnail image, a number provided uniquely to the image file at the time of photographing by a digital camera, or the hash value used when scanning the original image 203 by a specific logic, can be used for the image identification information.

In step S2303, the user terminal 1804 sends the verification data to the album management apparatus 1801. In step S2351, the album management apparatus 1801 receives the verification data from the user terminal 1804. In step S2352, the album management apparatus 1801 checks if the image placed in the page specified in step S2301 overlaps with the image already placed in other page of the album, based on the verification data received by step S2351. The processing is described in detail below with reference to FIG. 28.

In step S2353, the album management apparatus 1801 sends the result of overlapping check in step S2352 to the user terminal 1804. In step S2304, the user terminal 1804 receives the result of the overlapping check from the album management apparatus 1801. Then, in step S2305, the user terminal 1804 determines whether there is an overlapping of image. If it is determined that there is the overlapping, the processing advances to step S2306. On the other hand, if it is determined that there is no overlapping, the processing advances to step S2309. In step S2306, the user terminal 1804 performs processing for displaying a warning about the overlapping image and checking the overlapping. The processing is described in detail later below with reference to FIG. 30.

In step S2307, the user terminal 1804 determines whether the overlapping image should be corrected. For example, the user terminal 1804 displays a dialog box for making a selection as to whether the overlapping image should be corrected, on the display unit 101 of the user terminal 1804 so that the participant B can make the selection. If the overlapping image should be corrected, the user terminal 1804 performs the editing processing of the page (step S2308) and then returns the processing to step S2302. If the overlapping image should not be corrected, the user terminal 1804 advances the processing to step S2309.

In step S2309, the user terminal 1804 sends the page data to the album management apparatus 1801. At this time, in this exemplary embodiment, the user terminal 1804 performs processing for rendering one two-page-spread of the page data, and then sends the result of the rendering to the album management apparatus 1801. The rendering processing of each page data can also be performed when the user terminal 1804 sends the page data including the original image and the editing information to the album management apparatus 1801, and the album management apparatus 1801 displays the page and performs the print processing.

In step S2354, the album management apparatus 1801 receives the page data from the user terminal 1804.

In step S2355, the album management apparatus 1801 checks the images again as to overlapping based on the verification data received by step S2351. The processing is performed because it is necessary to make the check again considering the possibility that other participant has updated the page data of the album during a time elapsed from the checking of the overlapping of images in step S2352 to the processing in step S2354.

In step S2356, the album management apparatus 1801 determines whether there is the overlapping of image in the page data sent by the user terminal 1804. Here, it is determined that there is the overlapping of image if other participant (for example, the participants C and D) has updated the image of the page data of each participant, as described above. Further, it is determined that there is the overlapping of image if the participant B attempts to register the page data (that is, when the participant B selects "register" button 3107 on a warning screen 3100 that is to be described below) even when there is the overlapping of images in step S2305.

If it is determined that there is the overlapping of images in step S2356, the album management apparatus 1801 identifies other participant who has registered the overlapping image (for example, the participants C and D) and notifies the overlapping of images by the electronic mail (step S2357). In order to acquire the electronic mail addresses of other participants, first, the album management apparatus 1801 searches for the records in the image management table 500. Then, the album management apparatus 1801 acquires the image file path 513 set for the record. Then, the album management apparatus 1801 acquires the participant name of the concerned user from the page information management table 2700. Then, the album management apparatus 1801 can acquire the electronic mail address of other participant by searching for the electronic mail address 2002 of the concerned user from the participant information management table 2000, based on the acquired participant name. FIG. 26 illustrates one example of the content of the electronic mail that is notified in this case.

In step S2358, the album management apparatus 1801 registers the page data that is sent. More specifically, the album management apparatus 1801 produces a record that includes the page number of the concerned page and the participant name in the page information management table 2700 as schematically shown in FIG. 27, and then stores the file name and the number of the images of the page data in the page information management table 2700. The page information management table 2700 includes the information such as the page number 2701 of the allocated page of the album, a user name 2702 of the participant to whom the page is allocated, and a number of registered images 2703. In addition, the page information management table 2700 includes a file path name 2704 of the file that stores the page data uploaded from the user terminal 1804. Here, as the page number 2701, a value "1" is set to the first page, a value "2" is set to a next page (two-page-spread including pages 2 and 3), and a value "n+1" is set to pages beyond (two-page-spreads including pages 2n and 2n+1).

The album management apparatus 1801 registers each information about the verification data that corresponds to the image included in the page data in the image management table 500, that is schematically shown in FIG. 5. In the case where the page data is updated, past information registered in the image management table 500 is erased, unlike the newly added page data.

In step S2359, when the registration of the page data is completed, the album management apparatus 1801 notifies the completion of registration to the user terminal 1804. In step S2311, the user terminal 1804 receives the notification of the completion of registration from the album management apparatus 1801. Then, the processing for registering the page data ends.

Figure 28:
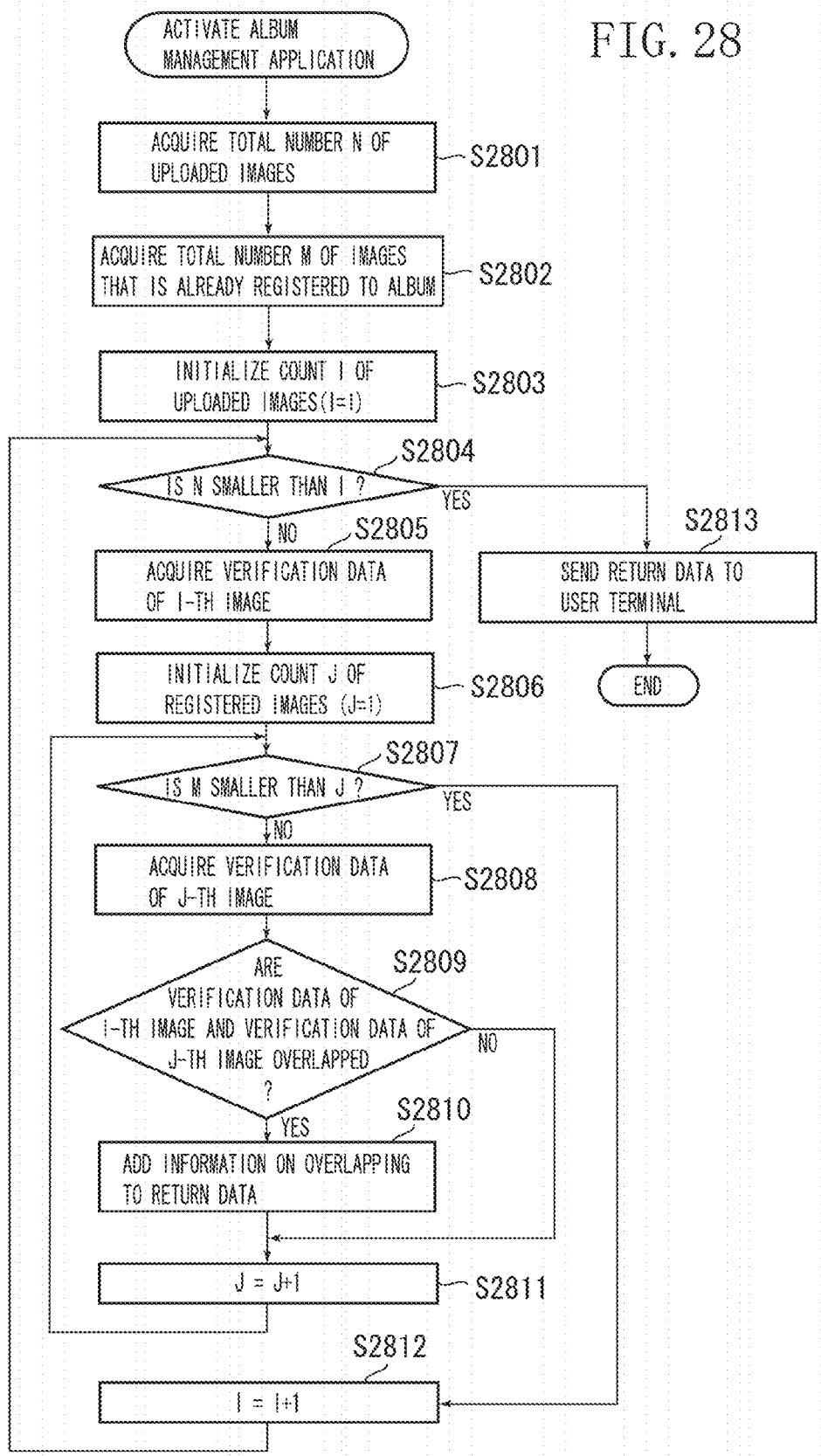
FIG. 28 is a flow chart that illustrates a procedure for checking the images for overlapping within the album performed by the album management apparatus according to the exemplary embodiment of the present invention.

FIG. 28 illustrates a flow chart of the procedure for checking the overlapping of images performed by the album management apparatus 1801 according to this exemplary embodiment. The processing as described below is performed by the CPU 106 of the album management apparatus 1801 that controls the various devices which are described with reference to FIG. 1, according to the album management application 1810.

In step S2801, the album management apparatus 1801 confirms the content of the verification data that is uploaded from the user terminal 1804 and acquires the total number N of the images included in the verification data.

In step S2802, the album management apparatus 1801 acquires the total number M of the images that are already registered to the album having the album identification notified by the user terminal 1804, namely, the album to which the page data is to be registered. Although not described in detail here, if the page to be registered already exists in the album, that is, if the page data is to be updated, the images in the page data are not counted in the total number of images that are already registered.

In step S2803, the album management apparatus 1801 initializes the work parameter I with a value "1" to count a number of the received images.

In step S2804, the album management apparatus 1801 compares the total number N of the received images with the work parameter I. If the work parameter I is greater than the total number N of the received images as a result of comparison in step S2804, the album management apparatus 1801 ends the processing for checking on he overlapping of images. If the work parameter I is equal to or less than the total number N of the received images, the album management apparatus 1801 checks if each image received from the user terminal 1804 overlaps with the image that is already registered to the album, by repeating the processing of steps S2805 through S2812.

In step S2805, the album management apparatus 1801 acquires the verification data for the I-th image that is received from the user terminal 1804. As described above, in this exemplary embodiment, the verification data includes the editing information and the thumbnail image produced from the original image that is used in the page in the user terminal 1804.

In step S2806, the album management apparatus 1801 initializes the work parameter J with a value "1" to count the images already used in the album.

In step S2807, the album management apparatus 1801 compares the total number M of the registered images with the work parameter J. If the work parameter J is greater than the total number M of the registered images, the album management apparatus 1801 ends the comparison with the verification data of the I-th image and shifts the processing to step S2812 and starts the checking of the overlapping of the received images. If the work parameter J is equal to or less than the total number M of the registered images, the album management apparatus 1801 checks the overlapping by performing the processing in steps S2808 through S2811.

In step S2808, the album management apparatus 1801 acquires the verification data of the J-th image among the images already registered to the album.

In step S2809, the album management apparatus 1801 determines whether the verification data of the I-th image and the verification data of the J-th image overlaps with each other. Here, in order to determine the overlapping, first, the album management apparatus 1801 performs comparison as to whether the verification data of both images match with each other. In this exemplary embodiment, the comparison is performed based on whether the binary data of the thumbnail images of both images completely match with each other. If it is determined that the verification data of both images do not overlap with each other, the album management apparatus 1801 shifts the processing to step S2811. If the binary data of the thumbnail images of both images match with each other, the album management apparatus 1801 compares the editing information of both images such as the setting for the cropped area. More specifically, the album management apparatus 1801 compares the cropped area of the I-th image included in the verification data sent by the user terminal 1804 with the cropped areas (503 through 506) of the J-th image stored in the album management apparatus 1801. Then, if no overlapping is present in the cropped area as a result of the comparison, the album management apparatus 1801 determines that there is no overlapping of images and shifts the processing to step S2810. In this exemplary embodiment, the images are determined to overlap with each other even if they match in a very small degree. However, the embodiment is not limited to this configuration. That is, the images can also be determined to overlap with each other when an area of overlapping exceeds a specific ratio. In addition, the images rotated by different angles can also be determined not to overlap with each other, considering the rotation operation of the image as the editing information.

If it is determined that the images overlap with each other in step S2809, then in step S2810, the album management apparatus 1801 adds information concerning the overlapping of images to the data to be returned to the user terminal 1804. FIG. 29 illustrates one example of the content of the data to be returned that is produced in this case. In this example, a second image among the images that are sent, overlaps with a twelfth image among the images registered to the album management apparatus 1801. If a plurality of overlapping images are found, the album management apparatus 1801 adds a value "1" to the value of an ImageCount variable for a Same Image tag, and one SameItem tag is newly added. If no overlapping is found, the value for the ImageCount variable of the Same Image tag is set to "0" in the data to be returned as shown in FIG. 29, and no SameItem tag exists.

In step S2811, the album management apparatus 1801 adds a value "1" to the work parameter J. By performing the processing of steps S2808 through S2811 for a number of times equivalent to the number of images registered to the album, the returned data that concerns the received I-th image can be produced.

In step S2812, the album management apparatus 1801 adds a value "1" to the work parameter I. By performing the processing of steps S2804 through S2812, the returned data that includes the result of checking of the overlapping images with respect to all the images that are sent, can be produced.

In step S2813, the album management apparatus 1801 sends the returned data to the user terminal 1804.

By performing the above processing, the album management apparatus 1801 can check the overlapping of the image already registered to the album management apparatus 1801 with the image received from the user terminal 1804.

Next, the description is made as to the processing displaying the warning screen and checking on the overlapping in step S2306.

Figure 30:
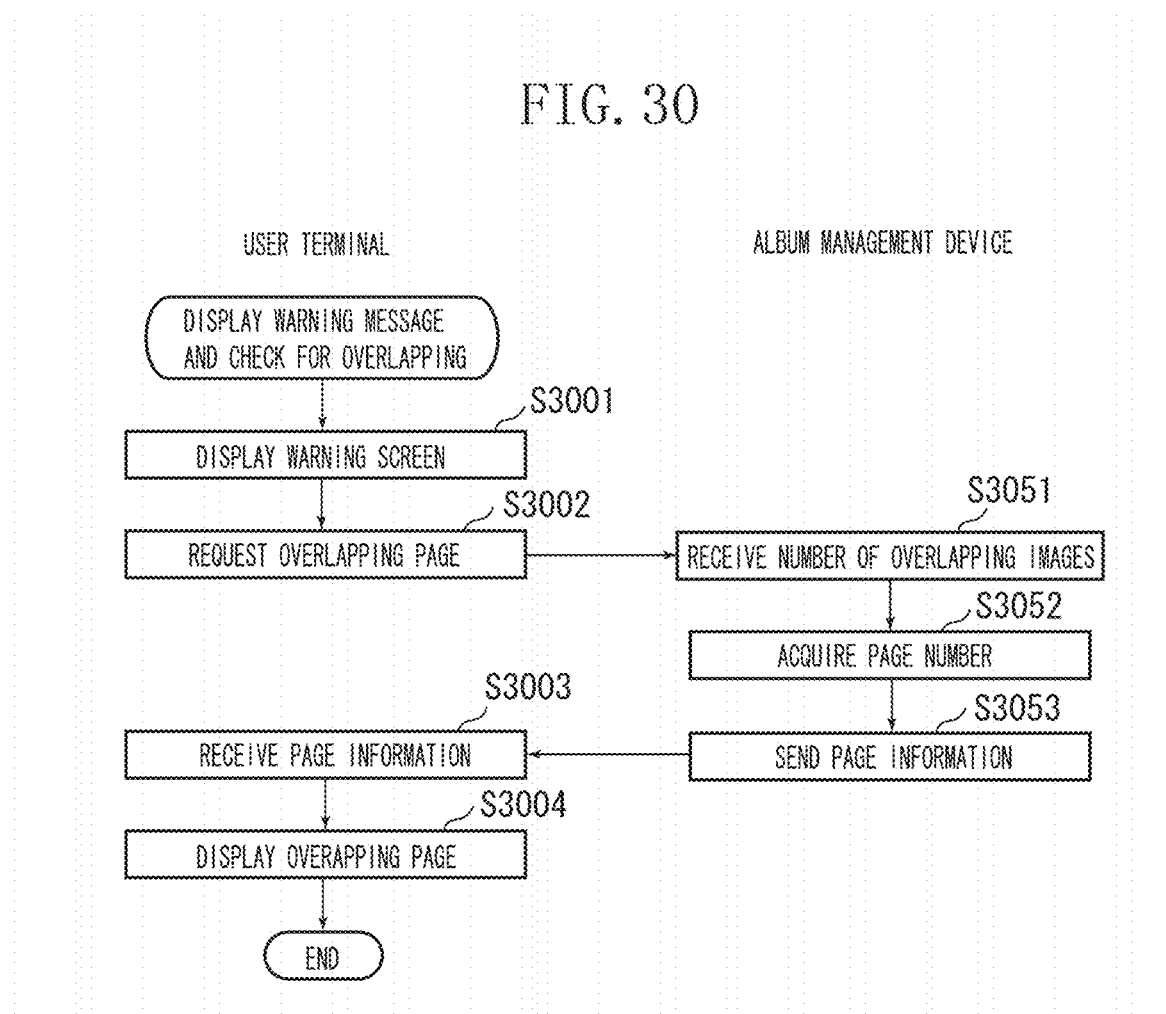
FIG. 30 is a flow chart that illustrates a procedure for checking the images for overlapping within the album performed by the user terminal and the album management apparatus according to the exemplary embodiment of the present invention.

FIG. 30 illustrates a flow chart showing a procedure for displaying the warning screen and confirming overlapping images, performed by the album management apparatus 1801 and the user terminal 1804 when the image already registered to the album management apparatus 1801 overlaps with the image received from the user terminal 1804. The processing described below is performed by the CPU 106 of the user terminal 1804 and the CPU 106 of the album management apparatus 1801, according to the album editing application 1811 and the album management application 1810, respectively.

The processing described below starts upon receipt of the returned data that includes the result of checking on the overlapping by the user terminal 1804, from the album management apparatus 1801. Here, the result of checking on the overlapping indicates that there is overlapping between the image uploaded from the user terminal 1804 and the image already registered to the album management apparatus 1801.

Figure 31:
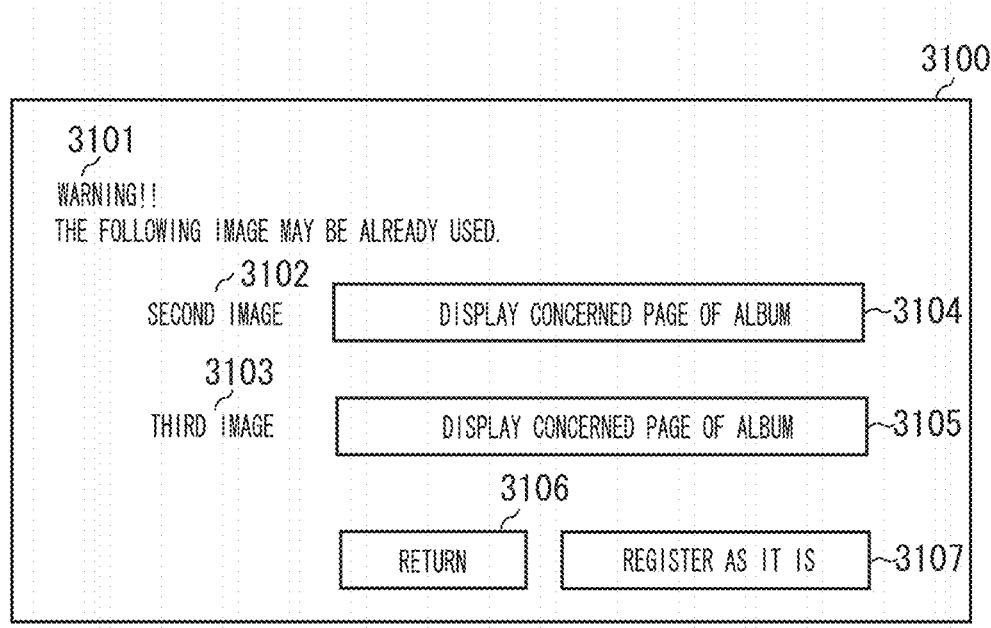
FIG. 31 illustrates one example of a warning screen according to the exemplary embodiment of the present invention.

In step S3001, the user terminal 1804 displays the warning screen on the display unit 101, based on the returned data. FIG. 31 illustrates one example of a warning screen 3100 displayed in step S3001. In this example, the warning of overlapping is issued with respect to two images. In the warning screen 3100, a warning message 3101 that indicates the overlapping of images and messages 3102 and 3103 that indicate which images overlap with each other, are displayed. In addition, buttons 3104 and 3105 for displaying the page that includes the overlapping image from the album registered in the album management apparatus 1801, are displayed. Further, a button 3106 for returning to the two-page-spread editing screen 2200 and a button 3107 for registering the page data in the album management apparatus 1801 are displayed.

When the button 3104 or the button 3105 for displaying the page that includes the overlapping image from the album registered in the album management apparatus 1801 are selected, the user terminal 1804 requests for the overlapping page to the album management apparatus 1801 in step S3002. More specifically, the user terminal 1804 sends the image ID of the overlapping image as shown in FIG. 29 to the album management apparatus 1801 and requests for the page data that includes the overlapping image.

In step S3051, when the album management apparatus 1801 receives the image ID, the album management apparatus 1801 searches for the record that includes the image ID from the image management table 500 in step S3052 so as to acquire the image file path 513. Then, the album management apparatus 1801 searches for the record that includes the page number of the concerned page from the page information management table 2700 so as to acquire the page data file name 2704. Then, the album management apparatus 1801 acquires the page data based on the acquired page data file name 2704.

In step S3053, the album management apparatus 1801 returns the page data acquired by step S3052 to the user terminal 1804. At the same time, the album management apparatus 1801 returns the displayed rectangle positions 509 through 512 within the page registered in the image management table 500.

Figure 32:
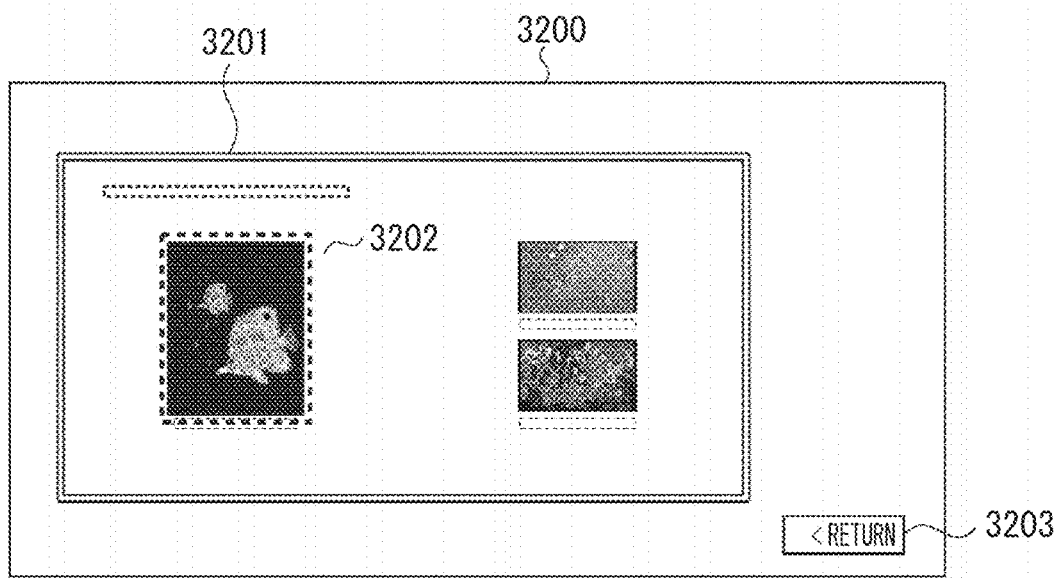
FIG. 32 illustrates one example of an overlapping checking screen according to the exemplary embodiment of the present invention.
Figure 33:
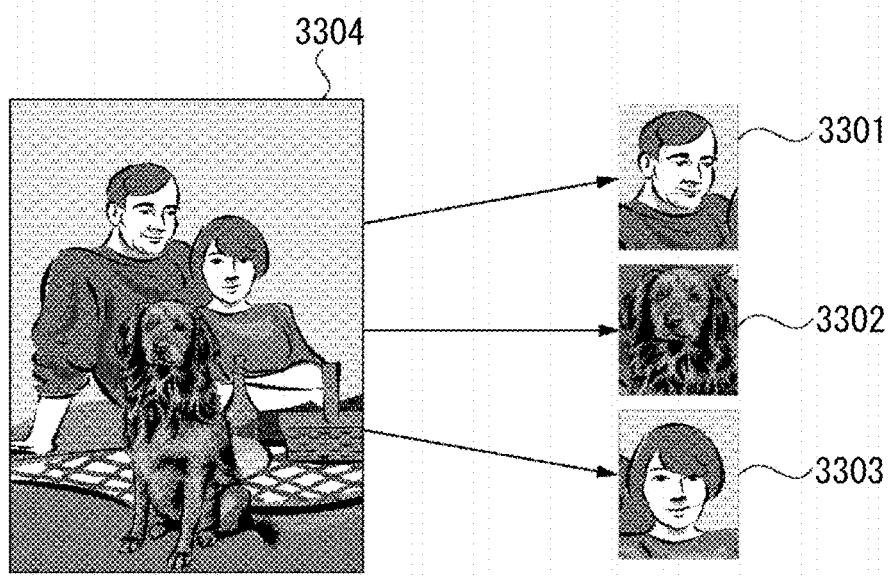
FIG. 33 illustrates one example in which plural portions of one image are cropped from the image.
Figure 34:
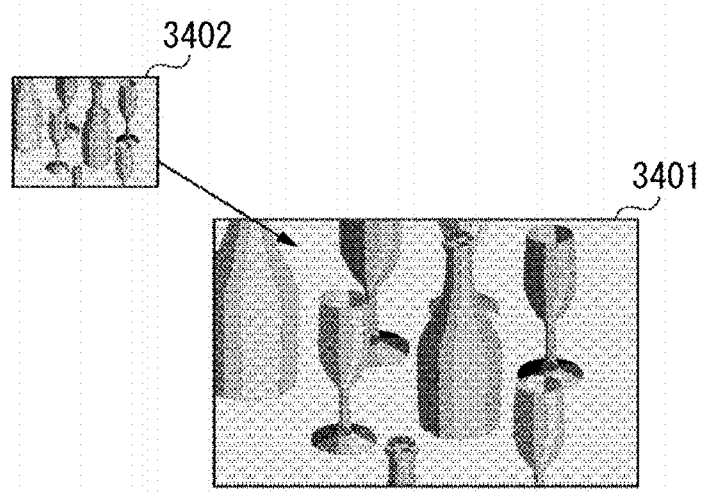
FIG. 34 illustrates one example of the images having different magnifications that are obtained from one image.

In step S3003, the user terminal 1804 receives the page data and the information about the displayed rectangle for the overlapping image. In step S3004, the user terminal 1804 displays the content of the received data and the received information on the display unit 101. FIG. 32 illustrates an overlapping checking screen 3200 displayed on the display unit 101 of 4, in which the page including the image registered in the album management apparatus 1801 is displayed. In a page area 3201 of the overlapping checking screen 3200, the image that is determined as overlapping is highlighted with a rectangle 3202. When the user selects a return button 3203, the display returns to the warning screen 3100.

In sending the page data from the album management apparatus 1801 to the user terminal 1804, the information concerning an owner of the page data can also be sent together with the page data so as to display the content of the information on the overlapping checking screen 3200.

By performing the above processing, when the page data produced by the user terminal 1804 in the album management apparatus 1801 is uploaded, the overlapping with the image already present in the album stored by the album management apparatus 1801 can be checked. If the overlapping image exists, the content of the image can be checked using each of the user terminals 1803 through 1806.

At the time of selecting of the return button 3104 in the warning screen 3100 so as to display the page editing screen 2200, the overlapping image can be highlighted for warning. For example, the overlapping image can be displayed for warning on the page editing screen 2200 in the same manner as highlighting the overlapping image among the images currently edited on the overlapping checking screen 3200.

In this exemplary embodiment, the method is described which checks on overlapping of the image in the course of uploading the page data from the user terminal 1804. However, the exemplary embodiment is not limited to this configuration. That is, the overlapping of images can be checked at an arbitrary timing during the editing of the page by selecting the button 2208 for checking on the overlapping in the page editing screen 2200. In addition, the overlapping can be checked only with respect to the image to be added to the page in timing at which the image is added.

According to this exemplary embodiment, when a layout of the image is edited in a plurality of information processing apparatus via a network, it can be determined whether the display area of the image that is going to be uploaded to one of the information processing apparatuses overlaps with the display area of the image that is uploaded by other information processing apparatus. When it is determined that there is overlapping, the warning is issued to the user. Thus, the user can readily notice whether the image that other user uses overlaps with his own image.

The aspect of the present invention can also be achieved by providing the system or the device with a storage medium which records a program code of software implementing the function of the embodiment and by reading and executing the program code stored in the storage medium with a computer of the system or the device (the CPU or the MPU).

In this case, the program code itself, which is read from the storage medium, implements the function of the embodiment mentioned above, and accordingly, the storage medium storing the program code constitutes the present invention.

As the storage medium for supplying such program code, a flexible disk, a hard disk, an optical disk, a magneto-optical disk, a CD-ROM, a CD-R, a magnetic tape, a nonvolatile memory card, or a ROM can be used.

In addition, the function according to the embodiments described above is implemented not only by executing the program code read by the computer, but also implemented by the processing in which an OS or the like carries out a part of or the whole of the actual processing based on the instruction given by the program code.

Further, in another aspect of the embodiment of the present invention, after the program code read from the storage medium is written into a memory provided in a function enhancing board inserted into the computer or in a function enhancing unit connected to the computer, the CPU provided in the function enhancing board or the function enhancing unit carries out a part of or the whole of the processing to implement the function of the embodiment as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image layout apparatus comprising:
a memory;
a processor coupled to the memory;
a setting unit configured to set trimming positions of an image file in association with the image file, wherein the set trimming positions are configured to be used to trim the image file to produce a trimmed image for display in a document;
a layout unit configured to lay out a plurality of trimmed images on the document according to layout positions and to display the plurality of trimmed images on a display device, wherein the plurality of trimmed image includes a first trimmed image and a second trimmed image;
a determining unit configured to determine whether two displayed trimmed images are from the same image file by determining, for each image file used to produce the two displayed trimmed images, at least one of (i) whether a name of each image file is the same and (ii) whether binary data of each image file is the same;
a computing unit configured to compute, when the determining unit determines that the first trimmed image and the second trimmed image are from the same image file, an overlapping area and an overlapping size ratio, wherein the overlapping area is a region within which the trimming positions of the first trimmed image and the trimming positions of the second trimmed image lap over each other and wherein the overlapping size ratio is a percentage that represents a measure of the relative size of the computed overlapping area to a size of one of the first trimmed image and the second trimmed image, wherein the determining unit further is configured to determine whether the first trimmed image and the second trimmed image are duplicate trimmed images by determining whether the computed overlapping size ratio is smaller than a predetermined overlapping size ratio;
a notifying unit configured to perform notification; and
a preventing unit configured to prevent the notifying unit from performing the notification when the determining unit determines that the computed overlapping size ratio is smaller than a predetermined overlapping size ratio, and to permit the notifying unit to perform the notification when the determining unit determines that the computed overlapping size ratio is not smaller than a predetermined overlapping size ratio,
wherein the setting unit, the layout unit, the determining unit, the computing unit, the notifying unit, and the preventing unit are implemented by the processor coupled to the memory.

2. The image layout apparatus according to claim 1, wherein the notifying unit performs the notification when the duplicate trimmed images are laid out on a same page spread of the document.

3. The image layout apparatus according to claim 1, wherein the computing unit computes (i) an overlapping area that represents an enclosed boundary amount by which the first and second trimmed images physically overlap each other and computes (ii) the overlapping size ratio by dividing the computed overlapping area into an area of the first and second trimmed images.

4. The image layout apparatus according to claim 1, further comprising a selecting unit, implemented by the processor coupled to the memory, configured to select a first page to be displayed on the display device from among a plurality of pages of the document in response to a user's operation, wherein, in response to the selecting unit selecting a second page to be displayed on the display device instead of the first page, the determining unit makes a determination, and, when the when the determining unit determines that a first trimmed image and a second trimmed image are from the same image file, the computing unit makes the computations, and the preventing unit either prevents the notifying unit from performing the notification or permits the notifying unit to perform the notification.

5. The image layout apparatus according to claim 1, wherein the computing unit is a first computing unit configured to compute the overlapping area and a second computing unit configured to compute the overlapping size ratio.

6. The image layout apparatus according to claim 1, wherein, when the determining unit determines that the first trimmed image and the second trimmed image are not from the same image file due to the name of the image file used to produce the displayed first trimmed image not matching the name of the image file used to produce the displayed second trimmed image, the computing unit does not compute an overlapping area and an overlapping size ratio, the determining unit does not further determine whether the first trimmed image and the second trimmed image are duplicate trimmed images, and the notifying unit does not perform the notification.

7. The image layout apparatus according to claim 1, wherein the notifying unit is configured to perform notification by notifying a message to the display device that the document includes duplicate trimmed images.

8. A method for an image layout apparatus having a notifying unit configured to perform notification, the method comprising:
setting trimming positions of an image file in association with the image file, wherein the set trimming positions are configured to be used to trim the image file to produce a trimmed image for display in a document;
laying out a plurality of trimmed images on the document according to layout positions and to display the plurality of trimmed images on a display device, wherein the plurality of trimmed image includes a first trimmed image and a second trimmed image;
determining whether two displayed trimmed images are from the same image file by determining, for each image file used to produce the two displayed trimmed images, at least one of (i) whether a name of each image file is the same and (ii) whether binary data of each image file is the same;

computing, when it is determined that the first trimmed image and the second trimmed image are from the same image file, an overlapping area and an overlapping size ratio, wherein the overlapping area is a region within which the trimming positions of the first trimmed image and the trimming positions of the second trimmed image lap over each other and wherein the overlapping size ratio is a percentage that represents a measure of the relative size of the computed overlapping area to a size of one of the first trimmed image and the second trimmed image, wherein determining further includes determining whether the first trimmed image and the second trimmed image are duplicate trimmed images by determining whether the computed overlapping size ratio is smaller than a predetermined overlapping size ratio; and preventing the notifying unit from performing the notification when it is determined that the computed overlapping size ratio is smaller than a predetermined overlapping size ratio, and permitting the notifying unit to perform the notification when it is determined that the computed overlapping size ratio is not smaller than a predetermined overlapping size ratio.

9. A non-transitory computer-readable storage medium storing a program that causes an image layout apparatus, having a notifying unit configured to perform notification, to perform a method, the method comprising:

setting trimming positions of an image file in association with the image file, wherein the set trimming positions are configured to be used to trim the image file to produce a trimmed image for display in a document;

laying out a plurality of trimmed images on the document according to layout positions and to display the plurality of trimmed images on a display device, wherein the plurality of trimmed image includes a first trimmed image and a second trimmed image;

determining whether two displayed trimmed images are from the same image file by determining, for each image file used to produce the two displayed trimmed images, at least one of (i) whether a name of each image file is the same and (ii) whether binary data of each image file is the same;

computing, when it is determined that the first trimmed image and the second trimmed image are from the same image file, an overlapping area and an overlapping size ratio, wherein the overlapping area is a region within which the trimming positions of the first trimmed image and the trimming positions of the second trimmed image lap over each other and wherein the overlapping size ratio is a percentage that represents a measure of the relative size of the computed overlapping area to a size of one of the first trimmed image and the second trimmed image, wherein determining further includes determining whether the first trimmed image and the second trimmed image are duplicate trimmed images by determining whether the computed overlapping size ratio is smaller than a predetermined overlapping size ratio; and preventing the notifying unit from performing the notification when it is determined that the computed overlapping size ratio is smaller than a predetermined overlapping size ratio, and permitting the notifying unit to perform the notification when it is determined that the computed overlapping size ratio is not smaller than a predetermined overlapping size ratio.

* * * * *